(12) United States Patent
Liu et al.

(10) Patent No.: US 9,894,388 B2
(45) Date of Patent: Feb. 13, 2018

(54) INTER-FRAME PREDICTIVE CODING METHOD AND CODER

(71) Applicant: Huawei Technologies Co., Ltd., Shenzhen, Guangdong (CN)

(72) Inventors: Chang Liu, Shenzhen (CN); Qingrui Han, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 265 days.

(21) Appl. No.: 14/861,267

(22) Filed: Sep. 22, 2015

(65) Prior Publication Data

US 2016/0014434 A1 Jan. 14, 2016

Related U.S. Application Data

(63) Continuation of application No. PCT/CN2014/076378, filed on Apr. 28, 2014.

(30) Foreign Application Priority Data

Sep. 18, 2013 (CN) .......................... 2013 1 0430799

(51) Int. Cl.
*H04N 19/96* (2014.01)
*H04N 19/119* (2014.01)
(Continued)

(52) U.S. Cl.
CPC ........... *H04N 19/96* (2014.11); *H04N 19/119* (2014.11); *H04N 19/176* (2014.11);
(Continued)

(58) Field of Classification Search
CPC .. H04N 19/176; H04N 19/159; H04N 19/119; H04N 19/96; H04N 19/177
See application file for complete search history.

(56) References Cited

U.S. PATENT DOCUMENTS 9,066,102 B2* 6/2015 Chen .................... H04N 19/159
2008/0008242 A1 1/2008 Lu et al.
(Continued)

FOREIGN PATENT DOCUMENTS

CN 101099394 A 1/2008
CN 102186070 A 9/2011
(Continued)

OTHER PUBLICATIONS

"Video coding for low bit rate communication", International Telecommunication Union, H.263, Jan. 2005, 226 pages.
(Continued)

*Primary Examiner* — Obafemi Sosanya

(57) ABSTRACT

The present invention discloses an inter-frame predictive coding method and a coder. Inter-frame predictive coding is sequentially performed on frames in multiple groups of pictures by using a group of pictures as a unit; a correlation between the reference B frame and a GPB frame in the same group of pictures is used; and when the maximum depth of the CTU in the same position in the GPB frame is smaller, a quantity of mode decisions performed on the CTU in the reference B frame may be relatively small, so that an objective of reducing complexity of an inter-frame predictive coding process of the reference B frame is achieved.

22 Claims, 9 Drawing Sheets

(51) Int. Cl.
*H04N 19/176* (2014.01)
*H04N 19/503* (2014.01)
*H04N 19/177* (2014.01)
*H04N 19/159* (2014.01)
*H04N 19/147* (2014.01)

(52) U.S. Cl.
CPC ......... *H04N 19/177* (2014.11); *H04N 19/503* (2014.11); *H04N 19/147* (2014.11)

(56) References Cited

U.S. PATENT DOCUMENTS

| | | | |
|---|---|---|---|
| 2010/0086029 A1* | 4/2010 | Chen | H04N 19/176 375/240.12 |
| 2013/0182760 A1 | 7/2013 | Sasai et al. | |
| 2013/0315302 A1* | 11/2013 | Lim | H04N 19/176 375/240.03 |

FOREIGN PATENT DOCUMENTS

| | | |
|---|---|---|
| CN | 102984521 A | 3/2013 |
| CN | 103281531 A | 9/2013 |
| CN | 103297774 A | 9/2013 |
| CN | 103491369 A | 1/2014 |
| WO | WO 2011/019249 A2 | 2/2011 |
| WO | WO 2013/002549 A2 | 1/2013 |

OTHER PUBLICATIONS

"Advanced video coding for generic audiovisual services", International Telecommunication Union, H.264, Apr. 2013, 732 pages.

Kiho Choi, et al., "Coding tree pruning based CU early termination", Hanyang University, Joint Collaborative Team on Video Coding, Jul. 14-22, 2011, 4 pages.

Il-Koo Kim, et al., "HM9: High Efficiency Video Coding (HEVC) Test Model 9 Encoder Description", Joint Collaborative Team on Video Coding, Oct. 10-19, 2012, 36 pages.

Liquan Shen, et al., "An Effective CU Size Decision Method for HEVC Encoders", IEEE Transactions on Multimedia, vol. 15, No. 2, Feb. 2013, pp. 465-470.

Ken McCann, "HM4: High Efficiency Video Coding (HEVC) Test Model 4 Encoder Description", Joint Collaborative Team on Video Coding (JCT-VC) of ITU-T SG16 WP3 and ISO/IEC JTC1/SC29/WG11, Jul. 14-22, 2011, 36 pages.

Jiawen Qiu, et al., "A Fast Coding Unit Selection Algorithm for HEVC", 2013 IEEE International Conference on Multimedia and Expo Workshops, Jul. 15, 2013, 5 pages.

Wei-Jhe Hsu, et al., "Fast Coding Unit Decision Algorithm for HEVC", 2013 Asia-Pacific Signal and Information Processing Association Annual Summit and Conference, Oct. 29, 2013, 4 pages.

Yongfei Zhang, et al., "Fast Coding Unit Depth Decision Algorithm for Interframe Coding in HEVC", 2013 Data Compression Conference, Mar. 20, 2013, pp. 53-62.

* cited by examiner

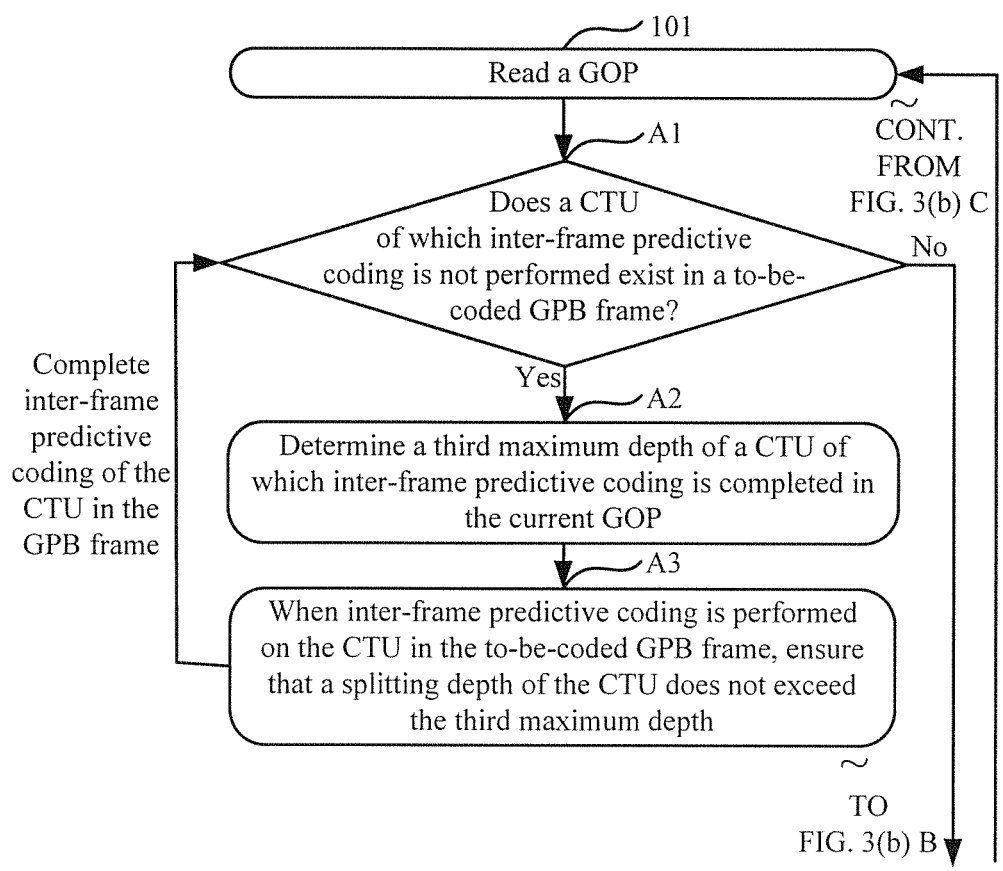
FIG. 3(b) A

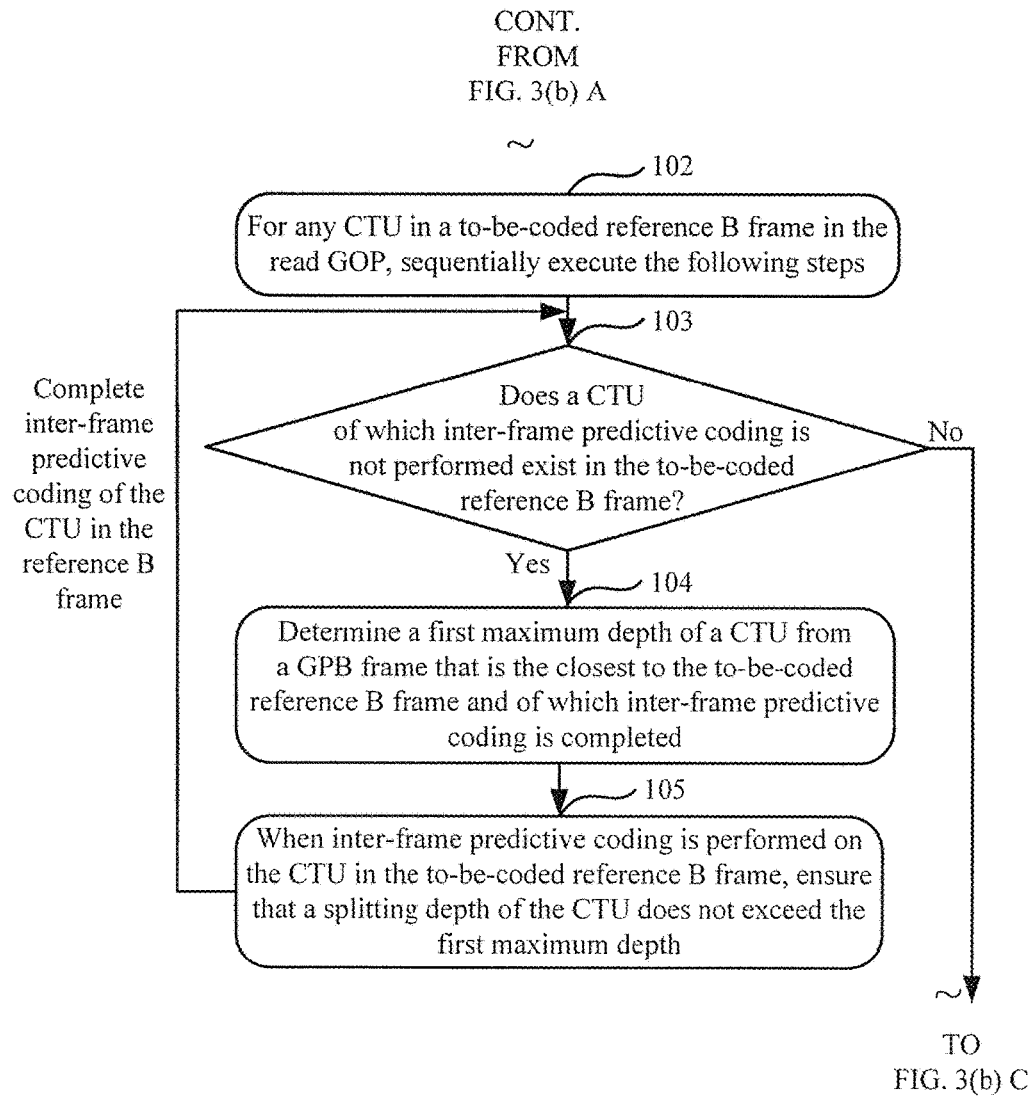
FIG. 3(b) B

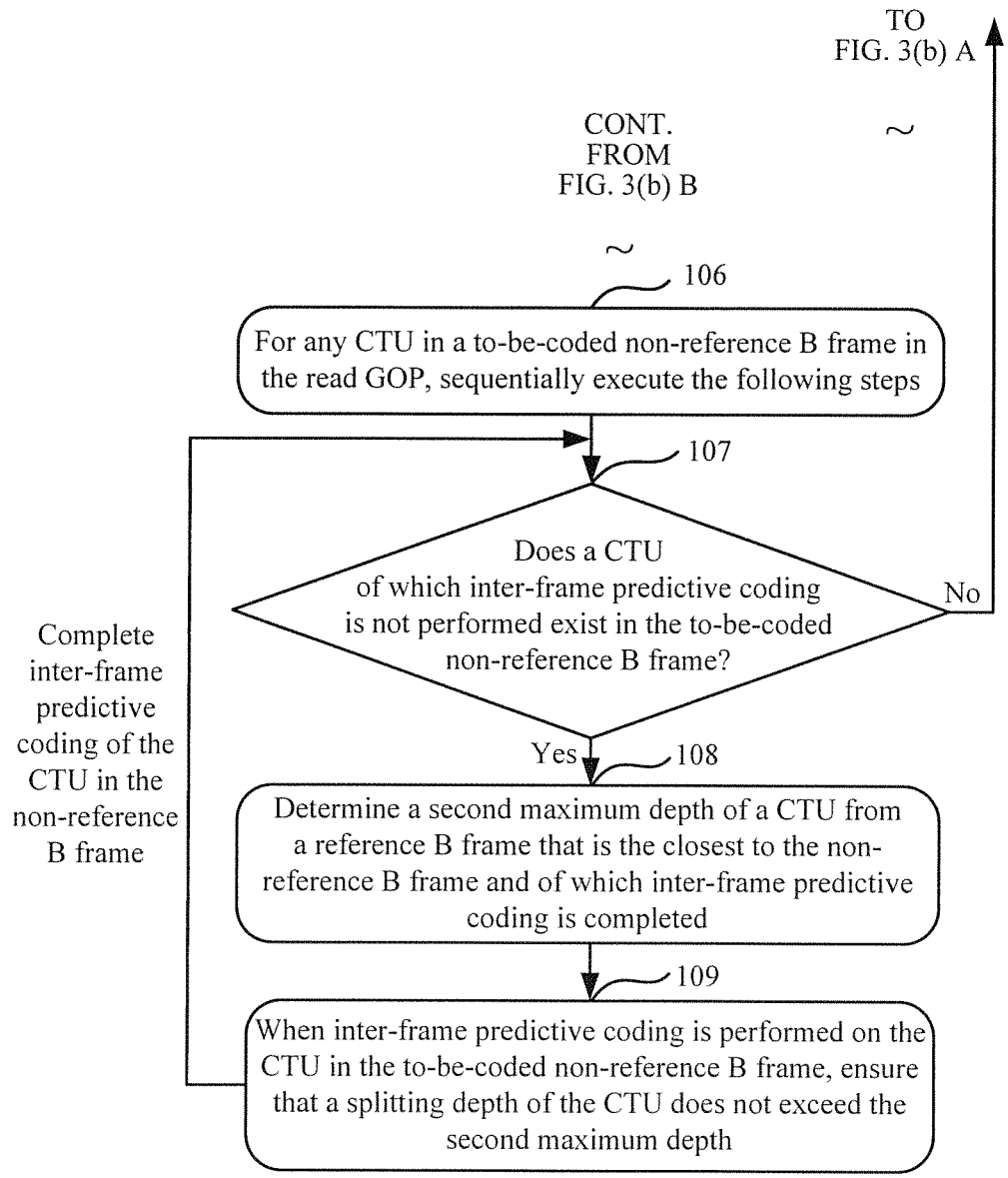
FIG. 3(b) C

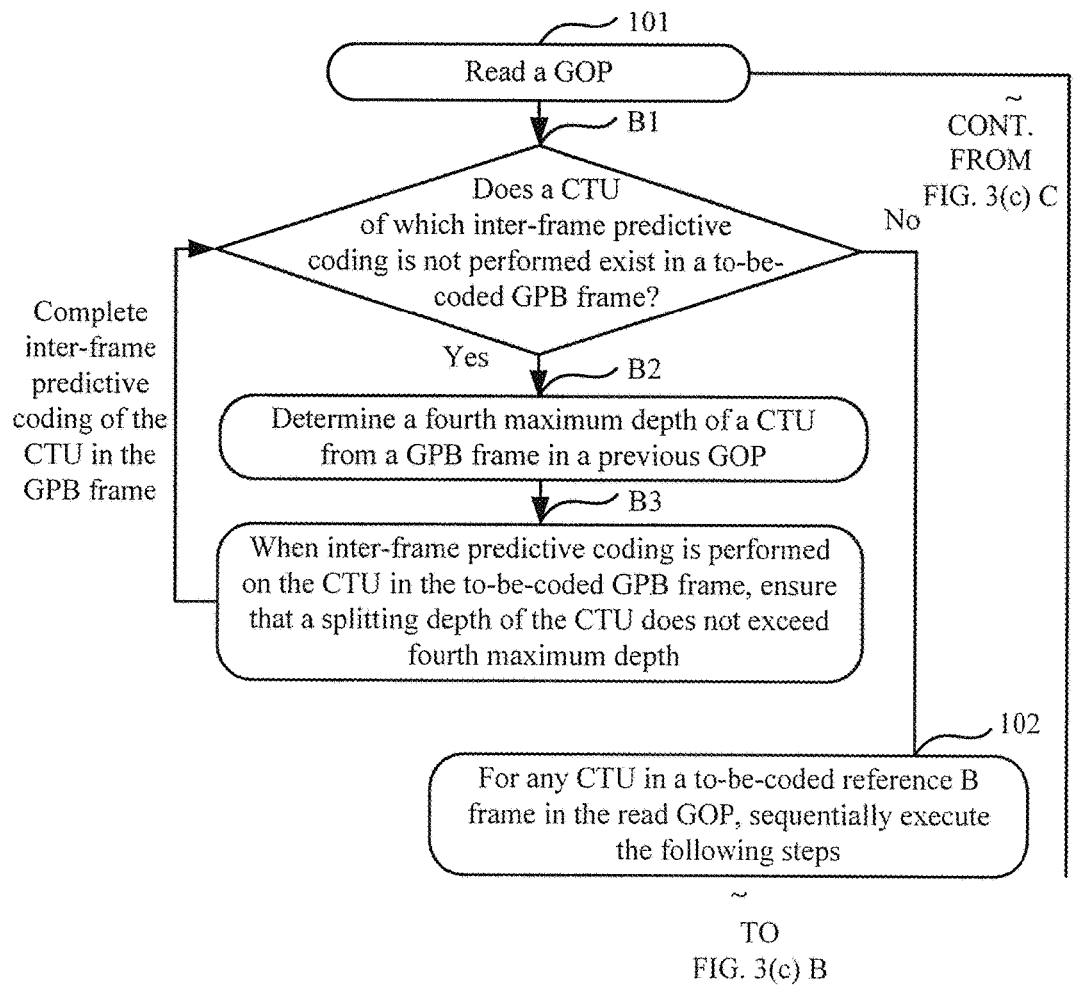
FIG. 3(c) A

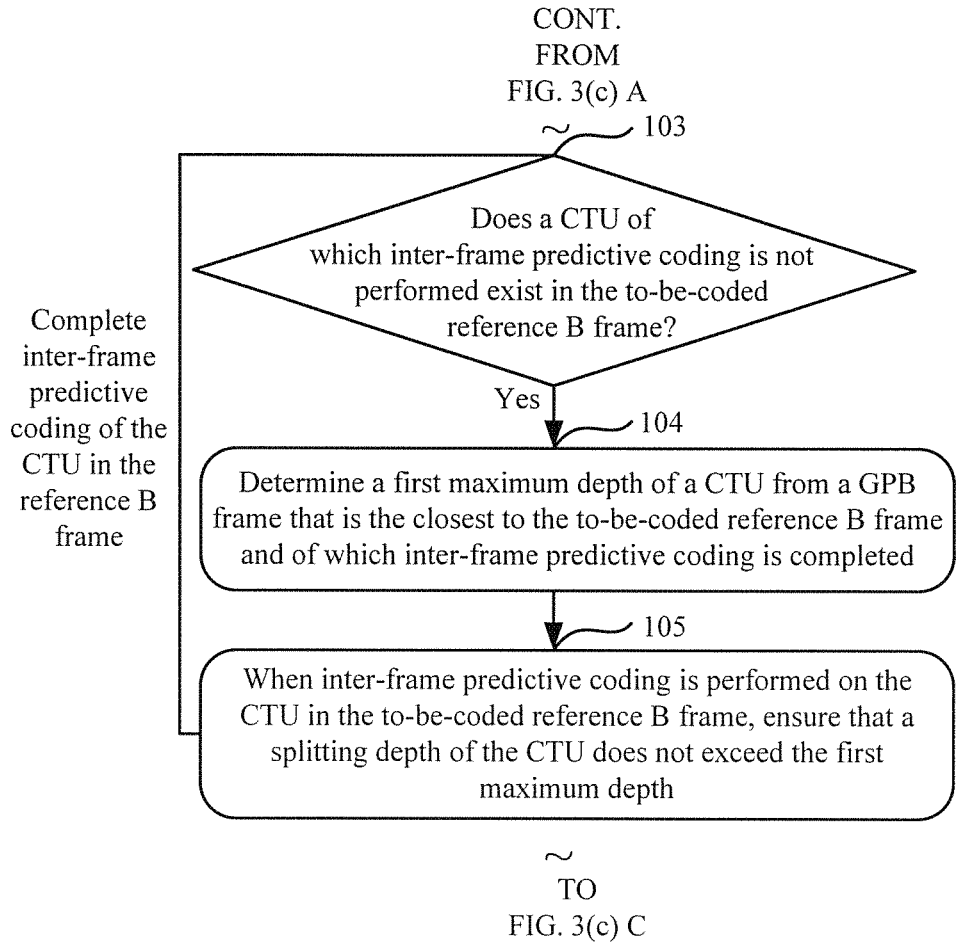
FIG. 3(c) B

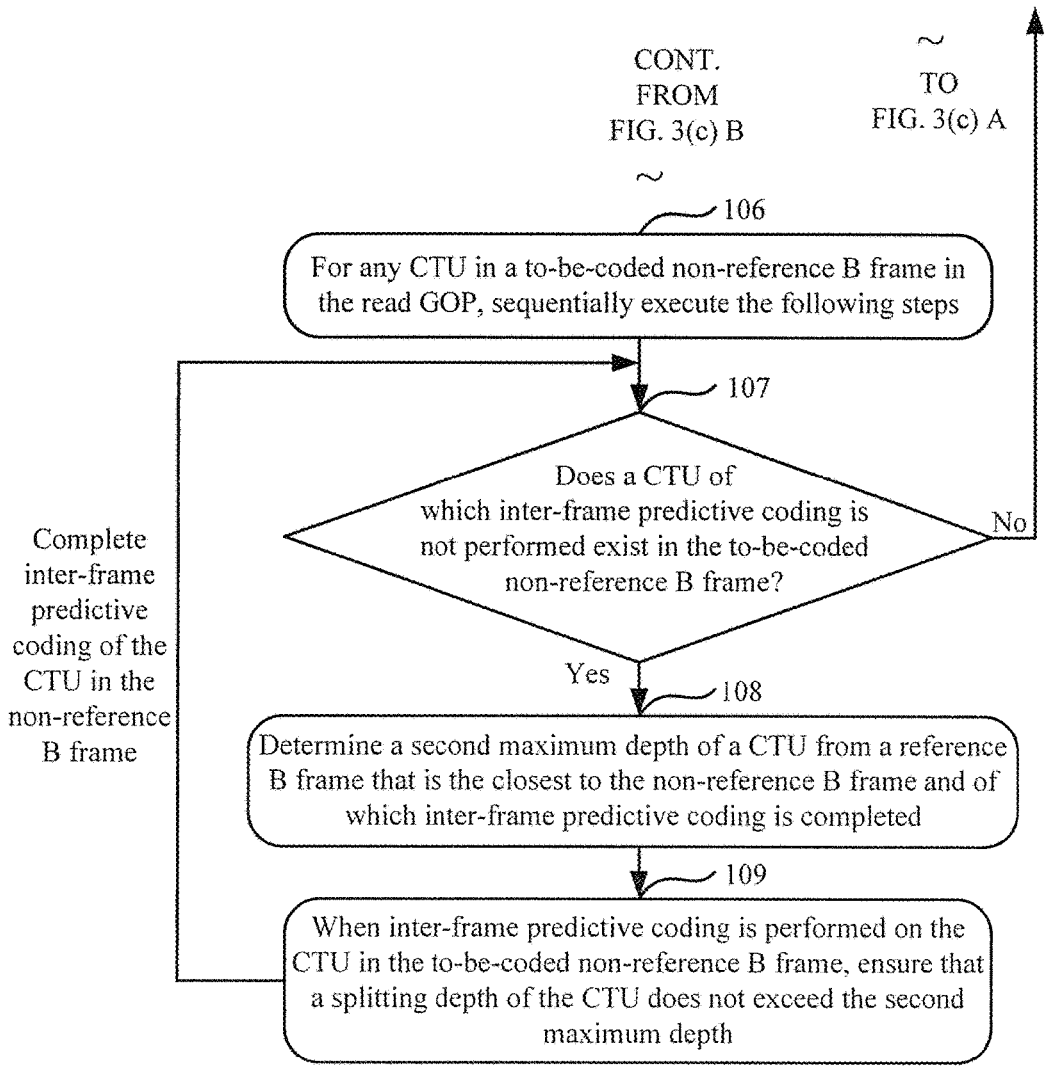
FIG. 3(c) C

INTER-FRAME PREDICTIVE CODING METHOD AND CODER

CROSS-REFERENCE TO RELATED APPLICATION

This application is a continuation of International Application No. PCT/CN2014/076378 filed on Apr. 28, 2014, which claims priority to Chinese Patent Application No. 201310430799.3, filed on Sep. 18, 2013, both of which are hereby incorporated by reference in their entireties.

TECHNICAL FIELD

The present invention relates to the field of picture processing technologies, and in particular, to an inter-frame predictive coding method and a coder.

BACKGROUND

High Efficiency Video Coding (HEVC) is a new-generation video coding standard after H. 264. HEVC still uses a hybrid coding framework of H.264, such as intra-frame prediction and inter-frame prediction, residual two-dimensional transform, loop filtering, and entropy coding. However, in this hybrid coding framework, a lot of technology innovations are further made in HEVC, where typical innovative technologies include:

(1) a quadtree based splitting structure, where a coding tree unit (CTU), a coding unit (CU), a prediction unit (PU), and a transform unit (TU) are used to describe an entire coding process. The CTU is a maximum coding unit in HEVC; the CTU may be subsplit into CUs, where the CUs are similar to macroblocks or sub-macroblocks in H.264, and each CU is a 2N×2N pixel block (N is a power of 2); and pixel block sizes of the PU and TU are 4×4;

(2) up to 35 intra-frame prediction modes included in an HEVC test model (EM);

(3) an advanced motion estimation technology, such as an advanced motion vector prediction (AMVP) technology and a motion merge technology;

(4) an adaptive loop filter technology, for example, using a sample adaptive offset (SAO) filter; and (5) a semantic-based entropy coding technology, for example, an entropy coding technology using adaptive binary arithmetic coding (CABAC).

In comparison with H.264, HEVC has the foregoing innovative technologies. Therefore, in comparison with using H.264 for coding, using HEVC for coding may achieve double compression efficiency, that is, in a case in which same video picture quality is ensured, a bit rate of a video stream is reduced by 50%.

While improving coding efficiency, HEVC also inevitably increases coding complexity. A feasible manner for reducing HEVC coding complexity is to optimize an inter-frame predictive coding process in HEVC. However, currently only a single optimization manner of inter-frame predictive coding is available, and it is necessary to find more optimization manners.

SUMMARY

The present invention provides an inter-frame predictive coding method and a coder, to solve a problem existing in the prior art that only a single optimization manner of inter-frame predictive coding is available.

According to a first aspect, an inter-frame predictive coding method is provided, where the method includes:

sequentially performing inter-frame predictive coding on frames in each group of pictures, where a process of performing inter-frame predictive coding on frames in any group of pictures is as follows:

for any coding tree unit CTU in a to-be-coded reference B frame in a current group of pictures, determining a first maximum depth of a CTU from a GPB frame or P frame that is the closest to the to-be-coded reference B frame in the current group of pictures and of which inter-frame predictive coding is completed, where the determined CTU and the CTU in the to-be-coded reference B frame are in a same position in their respective frames; and when inter-frame predictive coding is performed on the CTU in the to-be-coded reference B frame, that a splitting depth of the CTU does not exceed the first maximum depth.

With reference to the first aspect, in a first possible implementation manner, the method further includes:

if the first maximum depth is equal to a preset maximum depth, skipping a mode decision process with a depth of 0 when inter-frame predictive coding is performed on the CTU in the to-be-coded reference B frame.

With reference to the first aspect or the first possible implementation manner of the first aspect, in a second possible implementation manner, the method further includes:

when inter-frame predictive coding is performed on the CTU in the to-be-coded reference B frame, in a mode decision process of the CTU with any depth, skipping mode operations of an inter-frame N×2N mode and an inter-frame 2N×N mode, and performing mode operations of other modes by using a sum of absolute differences SAD algorithm.

With reference to the first aspect, the first possible implementation manner of the first aspect, or the second possible implementation manner of the first aspect, in a third possible implementation manner, the method further includes:

for any CTU in a to-be-coded non-reference B frame in the current group of pictures, determining a second maximum depth of a CTU from a reference B frame that is the closest to the to-be-coded non-reference B frame in the current group of pictures and of which inter-frame predictive coding is completed, where the determined CTU and the CTU in the to-be-coded non-reference B frame are in a same position in their respective frames; and when inter-frame predictive coding is performed on the CTU in the to-be-coded non-reference B frame, that a splitting depth of the CTU does not exceed the second maximum depth.

With reference to the third possible implementation manner of the first aspect, in a fourth possible implementation manner, the method further includes:

if the second maximum depth is equal to the preset maximum depth or the preset maximum depth minus 1, skipping a mode decision process with a depth of 0 when inter-frame predictive coding is performed on the CTU in the to-be-coded non-reference B frame.

With reference to the third possible implementation manner of the first aspect or the fourth possible implementation manner of the first aspect, in a fifth possible implementation manner, the method further includes:

when inter-frame predictive coding is performed on the CTU in the to-be-coded non-reference B frame, in a mode decision process of the CTU with any depth, skipping mode operations of the inter-frame N×2N mode and the interframe 2N×N mode, and performing mode operations of other modes by using the SAD algorithm.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner, the method further includes:

if a GPB frame of which inter-frame predictive coding is completed exists in the current group of pictures, for any CTU in a to-be-coded GPB frame in the current group of pictures, determining a third maximum depth of a CTU from the GPB frame of which inter-frame predictive coding is completed, where the determined CTU and the CTU in the to-be-coded GPB frame are in a same position in their respective frames; and when inter-frame predictive coding is performed on the CTU in the to-be-coded GPB frame, that a splitting depth of the CTU does not exceed the third maximum depth; or if no GPB frame of which inter-frame predictive coding is completed exists in the current group of pictures, for any CTU in a to-be-coded GPB frame in the current group of pictures, determining a fourth maximum depth of a CTU from a GPB frame in a previous group of pictures, where the determined CTU and the CTU in the to-be-coded GPB frame in the current group of pictures are in a same position in their respective frames; and when inter-frame predictive coding is performed on the CTU in the to-be-coded GPB frame, that a splitting depth of the CTU does not exceed the fourth maximum depth.

With reference to the sixth possible implementation manner of the first aspect, in a seventh possible implementation manner, the method further includes:

if the third maximum depth or the fourth maximum depth is equal to the preset maximum depth, skipping a mode decision process with a depth of 0 when inter-frame predictive coding is performed on the CTU in the to-be-coded GPB frame.

With reference to the sixth possible implementation manner of the first aspect or the seventh possible implementation manner of the first aspect, in an eighth possible implementation manner, the method further includes:

when inter-frame predictive coding is performed on the CTU in the to-be-coded GPB frame, in mode decisions of the CTU with depths of 0 to the preset maximum depth minus 1, skipping mode operations of the inter-frame N×2N mode and the inter-frame 2N×N mode, and performing a mode operation on the CTU by using a sum of absolute transformed differences SATD algorithm; or in a mode decision of the CTU with a depth of the preset maximum depth, performing mode operations of the inter-frame N×2N mode and the inter-frame 2N×N mode, and performing a mode operation on the CTU by using an SATD algorithm.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a ninth possible implementation manner, the method further includes:

if a P frame of which inter-frame predictive coding is completed exists in the current group of pictures, for any CTU in a to-be-coded P frame in the current group of pictures, determining a fifth maximum depth of a CTU from the P frame of which inter-frame predictive coding is completed, where the determined CTU and the CTU in the to-be-coded P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determining a sixth maximum depth of a CTU from a P frame in a previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

With reference to the ninth possible implementation manner of the first aspect, in a tenth possible implementation manner, the method further includes:

if the fifth maximum depth or the sixth maximum depth is equal to the preset maximum depth, skipping a mode decision process with a depth of 0 when inter-frame predictive coding is performed on the CTU in the to-be-coded P frame.

With reference to the ninth possible implementation manner of the first aspect or the tenth possible implementation manner of the first aspect, in an eleventh possible implementation manner, the method further includes:

when inter-frame predictive coding is performed on the CTU in the to-be-coded P frame, in mode decisions of the CTU with depths of 0 to the preset maximum depth minus 1, skipping mode operations of the inter-frame N×2N mode and the inter-frame 2N×N mode, and performing a mode operation on the CTU by using an SATD algorithm; or in a mode decision of the CTU with a depth of the preset maximum depth, performing mode operations of the inter-frame N×2N mode and the inter-frame 2N×N mode, and performing a mode operation on the CTU by using an SATD algorithm.

According to a second aspect, a coder is provided, where the coder includes:

a group of pictures reading module, configured to sequentially read groups of pictures; and a coding module, configured to perform the following inter-frame predictive coding on frames in any group of pictures:

for any CTU in a to-be-coded reference B frame in a current group of pictures, determining a first maximum depth of a CTU from a GPB frame or P frame that is the closest to the to-be-coded reference B frame in the current group of pictures and of which inter-frame predictive coding is completed, where the determined CTU and the CTU in the to-be-coded reference B frame are in a same position in their respective frames; and when inter-frame predictive coding is performed on the CTU in the to-be-coded reference B frame, that a splitting depth of the CTU does not exceed the first maximum depth.

With reference to the second aspect, in a first possible implementation manner, the coding module is further configured to: if the first maximum depth is equal to a preset maximum depth, skip a mode decision process with a depth of 0 when inter-frame predictive coding is performed on the CTU in the to-be-coded reference B frame.

With reference to the second aspect or the first possible implementation manner of the second aspect, in a second possible implementation manner, the coding module is further configured to: when inter-frame predictive coding is performed on the CTU in the to-be-coded reference B frame, in a mode decision process of the CTU with any depth, skip mode operations of an inter-frame N×2N mode and an inter-frame 2N×N mode, and perform mode operations of other modes by using a sum of absolute differences SAD algorithm.

With reference to the second aspect, the first possible implementation manner of the second aspect, or the second possible implementation manner of the second aspect, in a third possible implementation manner, the coding module is further configured to: for any CTU in a to-be-coded non-reference B frame in the current group of pictures, determine a second maximum depth of a CTU from a reference B frame that is the closest to the to-be-coded non-reference B frame in the current group of pictures and of which inter-frame predictive coding is completed, where the determined CTU and the CTU in the to-be-coded non-reference B frame are in a same position in their respective frames; and when inter-frame predictive coding is performed on the CTU in the to-be-coded non-reference B frame, that a splitting depth of the CTU does not exceed the second maximum depth.

With reference to the third possible implementation manner of the second aspect, in a fourth possible implementation manner, the coding module is further configured to: if the second maximum depth is equal to the preset maximum depth or the preset maximum depth minus 1, skip a mode decision process with a depth of 0 when inter-frame predictive coding is performed on the CTU in the to-be-coded non-reference B frame.

With reference to the third possible implementation manner of the second aspect or the fourth possible implementation manner of the second aspect, in a fifth possible implementation manner, the coding module is configured to: when inter-frame predictive coding is performed on the CTU in the to-be-coded non-reference B frame, in a mode decision process of the CTU with any depth, skip mode operations of the inter-frame N×2N mode and the inter-frame 2N×N mode, and perform mode operations of other modes by using the SAD algorithm.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner, the coding module is further configured to: if a GPB frame of which inter-frame predictive coding is completed exists in the current group of pictures, for any CTU in a to-be-coded GPB frame in the current group of pictures, determine a third maximum depth of a CTU from the GPB frame of which inter-frame predictive coding is completed, where the determined CTU and the CTU in the to-be-coded GPB frame are in a same position in their respective frames; and when inter-frame predictive coding is performed on the CTU in the to-be-coded GPB frame, that a splitting depth of the CTU does not exceed the third maximum depth; or if no GPB frame of which inter-frame predictive coding is completed exists in the current group of pictures, for any CTU in a to-be-coded GPB frame in the current group of pictures, determine a fourth maximum depth of a CTU from a GPB frame in a previous group of pictures, where the determined CTU and the CTU in the to-be-coded GPB frame in the current group of pictures are in a same position in their respective frames; and when inter-frame predictive coding is performed on the CTU in the to-be-coded GPB frame, that a splitting depth of the CTU does not exceed the fourth maximum depth.

With reference to the sixth possible implementation manner of the second aspect, in a seventh possible implementation manner, the coding module is further configured to: if the third maximum depth or the fourth maximum depth is equal to the preset maximum depth, skip a mode decision process with a depth of 0 when inter-frame predictive coding is performed on the CTU in the to-be-coded GPB frame.

With reference to the sixth possible implementation manner of the second aspect or the seventh possible implementation manner of the second aspect, in an eighth possible implementation manner, the coding module is further configured to: when inter-frame predictive coding is performed on the CTU in the to-be-coded GPB frame, in mode decisions of the CTU with depths of 0 to the preset maximum depth minus 1, skip mode operations of the inter-frame N×2N mode and the inter-frame 2N×N mode, and perform a mode operation on the CTU by using a sum of absolute transformed differences SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a ninth possible implementation manner, the coding module is further configured to: if a P frame of which inter-frame predictive coding is completed exists in the current group of pictures, for any CTU in a to-be-coded P frame in the current group of pictures, determine a fifth maximum depth of a CTU from the P frame of which inter-frame predictive coding is completed, where the determined CTU and the CTU in the to-be-coded P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determine a sixth maximum depth of a CTU from a P frame in a previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

With reference to the ninth possible implementation manner of the second aspect, in a tenth possible implementation manner, the coding module is further configured to: if the fifth maximum depth or the sixth maximum depth is equal to the preset maximum depth, skip a mode decision process with a depth of 0 when inter-frame predictive coding is performed on the CTU in the to-be-coded P frame.

With reference to the ninth possible implementation manner of the second aspect or the tenth possible implementation manner of the second aspect, in an eleventh possible implementation manner, the coding module is further configured to: when inter-frame predictive coding is performed on the CTU in the to-be-coded P frame, in mode decisions of the CTU with depths of 0 to the preset maximum depth minus 1, skip mode operations of the inter-frame N×2N mode and the inter-frame 2N×N mode, and perform a mode operation on the CTU by using an SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm.

According to a third aspect, a coder is provided, where the coder includes:

an interface, configured to sequentially read groups of pictures;

a processor, configured to perform the following inter-frame predictive coding on frames in any group of pictures:

for any CTU in a to-be-coded reference B frame in a current group of pictures, determining a first maximum depth of a CTU from a GPB frame or P frame that is the closest to the to-be-coded reference B frame in the current group of pictures and of which inter-frame predictive coding is completed, where the determined CTU and the CTU in the to-be-coded reference B frame are in a same position in their respective frames; and when inter-frame predictive coding is performed on the CTU in the to-be-coded reference B frame, that a splitting depth of the CTU does not exceed the first maximum depth; and a memory, configured to store a maximum depth of each CTU in the GPB frame or P frame that is in the group of pictures and of which inter-frame predictive coding is completed.

With reference to the third aspect, in a first possible implementation manner, the processor is further configured to: if the first maximum depth is equal to a preset maximum depth, skip a mode decision process with a depth of 0 when inter-frame predictive coding is performed on the CTU in the to-be-coded reference B frame; and the memory is further configured to store the preset maximum depth.

With reference to the third aspect or the first possible implementation manner of the third aspect, in a second possible implementation manner, the processor is further configured to: when inter-frame predictive coding is performed on the CTU in the to-be-coded reference B frame, in a mode decision process of the CTU with any depth, skip mode operations of an inter-frame N×2N mode and an inter-frame 2N×N mode, and perform mode operations of other modes by using a sum of absolute differences SAD algorithm; and the memory is further configured to store multiple types of mode operation information.

With reference to the third aspect, the first possible implementation manner of the third aspect, or the second possible implementation manner of the third aspect, in a third possible implementation manner, the processor is further configured to: for any CTU in a to-be-coded non-reference B frame in the current group of pictures, determine a second maximum depth of a CTU from a reference B frame that is the closest to the to-be-coded non-reference B frame in the current group of pictures and of which inter-frame predictive coding is completed, where the determined CTU and the CTU in the to-be-coded non-reference B frame are in a same position in their respective frames; and when inter-frame predictive coding is performed on the CTU in the to-be-coded non-reference B frame, that a splitting depth of the CTU does not exceed the second maximum depth; and the memory is further configured to store a maximum depth of each CTU in a reference B frame that is in the group of pictures and of which inter-frame predictive coding is completed.

With reference to the third possible implementation manner of the third aspect, in a fourth possible implementation manner, the processor is further configured to: if the second maximum depth is equal to the preset maximum depth or the preset maximum depth minus 1, skip a mode decision process with a depth of 0 when inter-frame predictive coding is performed on the CTU in the to-be-coded non-reference B frame; because a quantity of decisions performed on the non-reference B frame is reduced, an inter-frame predictive coding process of the non-reference B frame may be simplified, and an inter-frame predictive coding time is shortened.

With reference to the third possible implementation manner of the third aspect or the fourth possible implementation manner of the third aspect, in a fifth possible implementation manner, the processor is configured to: when inter-frame predictive coding is performed on the CTU in the to-be-coded non-reference B frame, in a mode decision process of the CTU with any depth, skip mode operations of the inter-frame N×2N mode and the inter-frame 2N×N mode, and perform mode operations of other modes by using the SAD algorithm; because mode operations of the non-reference B frame are reduced, the inter-frame predictive coding process of the non-reference B frame may be simplified, and the inter-frame predictive coding time is shortened.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a sixth possible implementation manner, the processor is further configured to: if a GPB frame of which inter-frame predictive coding is completed exists in the current group of pictures, for any CTU in a to-be-coded GPB frame in the current group of pictures, determine a third maximum depth of a CTU from the GPB frame of which inter-frame predictive coding is completed, where the determined CTU and the CTU in the to-be-coded GPB frame are in a same position in their respective frames; and when inter-frame predictive coding is performed on the CTU in the to-be-coded GPB frame, that a splitting depth of the CTU does not exceed the third maximum depth; or if no GPB frame of which inter-frame predictive coding is completed exists in the current group of pictures, for any CTU in a to-be-coded GPB frame in the current group of pictures, determine a fourth maximum depth of a CTU from a GPB frame in a previous group of pictures, where the determined CTU and the CTU in the to-be-coded GPB frame in the current group of pictures are in a same position in their respective frames; and when inter-frame predictive coding is performed on the CTU in to-be-coded the GPB frame, that a splitting depth of the CTU does not exceed the fourth maximum depth.

With reference to the sixth possible implementation manner of the third aspect, in a seventh possible implementation manner, the processor is further configured to: if the third maximum depth or the fourth maximum depth is equal to the preset maximum depth, skip a mode decision process with a depth of 0 when inter-frame predictive coding is performed on the CTU in the to-be-coded GPB frame; because a quantity of decisions performed on the GPB frame is reduced, the inter-frame predictive coding process of the GPB frame may be simplified, and the inter-frame predictive coding time is shortened.

With reference to the sixth possible implementation manner of the third aspect or the seventh possible implementation manner of the third aspect, in an eighth possible implementation manner, the processor is further configured to: when inter-frame predictive coding is performed on the CTU in the to-be-coded GPB frame, in mode decisions of the CTU with depths of 0 to the preset maximum depth minus 1, skip mode operations of the inter-frame N×2N mode and the inter-frame 2N×N mode, and perform a mode operation on the CTU by using a sum of absolute transformed differences SATD algorithm; or in a mode decision of the CTU with a depth of the preset maximum depth, perform mode operations of the inter-frame N×2N mode and the inter-frame 2N×N mode, and perform mode operations on the CTU by using an SATD algorithm; because mode operations of the GPB frame are reduced, the inter-frame predictive coding process of the GPB frame may be simplified, and the inter-frame predictive coding time is shortened.

With reference to the third aspect, the first possible implementation manner of the third aspect, the second possible implementation manner of the third aspect, the third possible implementation manner of the third aspect, the fourth possible implementation manner of the third aspect, or the fifth possible implementation manner of the third aspect, in a ninth possible implementation manner, the processor is further configured to: if a P frame of which inter-frame predictive coding is completed exists in the current group of pictures, for any CTU in a to-be-coded P frame in the current group of pictures, determine a fifth maximum depth of a CTU from the P frame of which inter-frame predictive coding is completed, where the determined CTU and the CTU in the to-be-coded P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determine a sixth maximum depth of a CTU from a P frame in a previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

With reference to the ninth possible implementation manner of the third aspect, in a tenth possible implementation manner, the processor is further configured to: if the fifth maximum depth or the sixth maximum depth is equal to the preset maximum depth, skip a mode decision process with a depth of 0 when inter-frame predictive coding is performed on the CTU in the to-be-coded P frame; because a quantity of decisions performed on the P frame is reduced, the inter-frame predictive coding process of the P frame may be simplified, and the inter-frame predictive coding time is shortened.

With reference to the ninth possible implementation manner of the third aspect or the tenth possible implementation manner of the third aspect, in an eleventh possible implementation manner, the processor is further configured to: when inter-frame predictive coding is performed on the CTU in the to-be-coded P frame, in mode decisions of the CTU with depths of 0 to the preset maximum depth minus 1, skip mode operations of the inter-frame N×2N mode and the inter-frame 2N×N mode, and perform a mode operation on the CTU by using an SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm; because mode operations of the P frame are reduced, the inter-frame predictive coding process of the P frame may be simplified, and the inter-frame predictive coding time is shortened.

According to a solution of the present invention, inter-frame predictive coding is sequentially performed on frames in multiple groups of pictures by using a group of pictures as a unit; when inter-frame predictive coding is performed on a reference B frame in any group of pictures, a correlation between the reference B frame and a GPB frame in the same group of pictures is used, so that a splitting depth of a CTU in the reference B frame does not exceed a maximum depth of a CTU in a same position in the GPB frame; and when the maximum depth of the CTU in the same position in the GPB frame is smaller, a quantity of mode decisions performed on the CTU in the reference B frame may be relatively small, so that an objective of reducing complexity of an inter-frame predictive coding process of the reference B frame is achieved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 3(a), FIG. 3(b) A, FIG. 3(b)B, FIG. 3(b)C, and FIG. 3(c) A, FIG. 3(c)B, FIG. 3(c)C, are schematic diagrams of steps of an inter-frame predictive coding method according to Embodiment 1 of the present invention;

DETAILED DESCRIPTION

To make the objectives, technical solutions, and advantages of the present invention clearer, the following further describes the present invention in detail with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

In a conventional inter-frame predictive coding process performed on a frame in an EN manner, a CTU may be split, and a mode decision is performed on a CU, obtained by splitting, with each depth.

Figure 1:
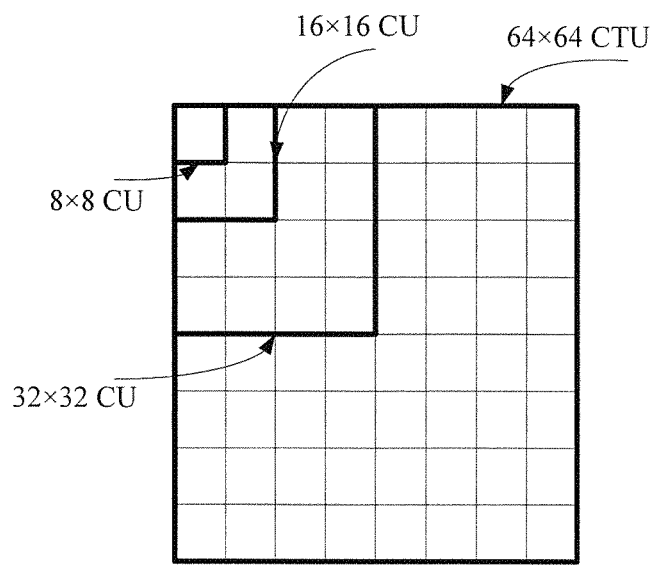
FIG. 1 is a schematic diagram of splitting of a CTU that is a 64×64 pixel block.

For example, refer to FIG. 1. A CTU whose pixel block is 64×64 is used as an example. Because the CTU may also be considered as a special CU, the CTU in this case is not split, and a depth corresponding to the CTU whose pixel block is 64×64 (namely, the CTU) is 0. A process of performing a mode decision on the CTU with a depth of 0 is as follows:

First, mode operations of eight modes are performed on the CTU whose pixel block is 64×64.

The eight modes are respectively a skip mode (SKIP mode), an inter-frame 2N×2N mode (an inter-frame 64×64 mode in this case), an inter-frame N×N mode (an inter-frame 32×32 mode in this case), an inter-frame N×2N mode (an inter-frame 32×64 mode in this case), an inter-frame 2N×N mode (an inter-frame 64×32 mode in this case), an intra-frame 2N×2N mode (an intra-frame 64×64 mode in this case), an intra-frame N×N mode (an intra-frame 32×32 mode in this case), and an intra-frame pulse code modulation (PCM) mode.

Then, cost values obtained after the operations of the eight modes are compared, and a mode with a minimum cost value is determined, and thereby a mode decision is completed. The foregoing is a manner of performing a mode decision by using eight modes. Certainly, the eight modes may not be used, but instead, other modes are selected to perform a mode decision.

After the mode decision is completed, the mode of the minimum cost value may be used to perform inter-frame predictive coding on the 64×64 CTU according to a decision result.

Then, the 64×64 CTU is split into four 32×32 CUs (a depth corresponding to the 32×32 CUs is 1), and a mode decision process and an inter-frame predictive coding process with a depth of 1 are performed again on each 32×32 CU according to mode operation results of the eight modes, and so on, until the CTU is split into 8×8 CUs (a depth corresponding to the 8×8 CUs is 3), and a mode decision process and an inter-frame predictive coding process with a depth of 3 are performed again on each 8×8 CU according to the mode operation results of the eight modes. In this case, inter-frame predictive coding of the CTU is completed.

As may be seen from FIG. 1, a maximum depth of the CTU is 3, and the maximum depth of the CTU refers to a depth corresponding to a minimum CU that is finally included in the CTU after the inter-frame predictive coding is completed. In FIG. 1, the CTU is split from 64×64, and when an 8×8 CU is obtained by splitting, a depth corresponding to the CU is 3, and therefore, a maximum depth of the CTU that includes the 8×8 CU is 3.

In addition to a CTU splitting process shown in FIG. 1, if a CTU is not a 64×64 pixel block, but a pixel block of another size, for example, a 128×128 pixel block, if a minimum CU that is finally included in the CTU after inter-frame predictive coding is completed is still an 8×8 CU, a depth corresponding to the 8×8 CU is 4, that is, a maximum depth of the CTU is 4.

Figure 2:
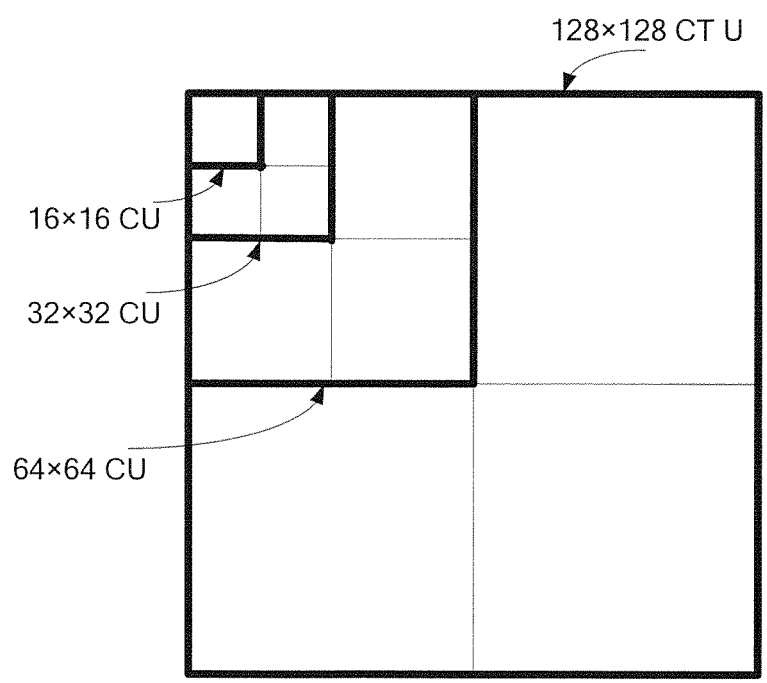
FIG. 2 is a schematic diagram of splitting of a CTU that is a 128×128 pixel block.

Regardless of a specific splitting process of the CTU, the maximum depth of the CTU is a depth corresponding to a minimum CU that is finally included in the CTU after the inter-frame predictive coding is completed. Using a case shown in FIG. 2 as an example, first, a mode decision process and an inter-frame predictive coding process with a depth of 0 are performed on a 128×128 CTU; then the 128×128 CTU is split into four 64×64 CUs, and assuming that after a mode decision process with a depth of 1 is performed on the four 64×64 CUs separately, it is determined that three 64×64 CUs of the four 64×64 CUs are not further split, but one remaining CU needs to be further split, the remaining 64×64 CU is split into four 32×32 CUs; assuming that after a mode decision process with a depth of 2 is performed on the four 32×32 CUs separately, it is determined that three 32×32 CUs of the four 32×32 CUs are not further split, but one remaining CU needs to be further split, the remaining 32×32 CU is split into four 16×16 CUs; assuming that after a mode decision process with a depth of 3 is performed on the four 16×16 CUs separately, it is determined that none of the four 16×16 CUs is further split, the inter-frame predictive coding process of the CTU is completed. In this case, a minimum CU included in the CTU is a 16×16 CU, and a depth corresponding to the minimum CU is 3, and therefore, a maximum depth of the CTU is also 3.

In view of the foregoing conventional inter-frame predictive coding process, an embodiment of the present invention provides a new inter-frame predictive coding solution to optimize the foregoing inter-frame predictive coding process. Inter-frame predictive coding is sequentially performed on frames in multiple groups of pictures by using a group of pictures (Group of Pictures, GOP) as a unit; when inter-frame predictive coding is performed on a reference B frame in any group of pictures, a correlation between the reference B frame and a GPB frame in the same group of pictures is used, so that a splitting depth of a CTU in the reference B frame does not exceed a maximum depth of a CTU in a same position in the GPB frame; and when the maximum depth of the CTU in the same position in the GPB frame is smaller, a quantity of mode decisions performed on the CTU in the reference B frame may be relatively small, so that an objective of reducing complexity of an inter-frame predictive coding process of the reference B frame is achieved.

A GOP involved in each embodiment of the present invention may be a 4-frame GOP (namely, a GOP including 4 frames), an 8-frame GOP (namely, a GOP including 8 frames), a 16-frame GOP (namely, a GOP including 16 frames), or the like, and a quantity of frames included in the GOP may be configured according to a requirement.

The frames in the GOP include a B frame, and further include a generalized P/B (GPB) frame or a P frame.

Using a GOP that includes a GPB frame and a B frame as an example, a quantity of GPB frames included in the GOP may be configured by using a configuration file, and may be one, or may be more than one. When inter-frame predictive coding is performed on a frame in a GOP, first, inter-frame predictive coding is performed on a GPB frame. If a same GOP includes multiple GPB frames, inter-frame predictive coding may be performed on one GPB frame first, and then inter-frame predictive coding may be performed on other GPB frames, or inter-frame predictive coding may not be performed on other GPB frames immediately, but instead, inter-frame predictive coding is performed on a B frame in the same GOP. In the embodiments of the present invention, after inter-frame predictive coding is performed on a first GPB frame, an order of performing inter-frame predictive coding on other frames is not limited.

A case in which a GOP includes a P frame and a B frame is similar to a case in which a GOP includes a GPB frame and a B frame, and is not further described herein.

Before a GOP is read, multiple B frames in the GOP are classified into reference B frames and non-reference B frames, where the reference B frames are classified according to configuration information in a configuration file, and the reference B frames may be used as reference frames for the non-reference B frames. After the reference B frames are obtained by means of classification, Flag values in the reference B frames may be set to 1, so that after reading a GOP, a coder distinguishes a reference B frame from a non-reference B frame in B frames according to Flag values in the B frames.

In the following, the solution of the present invention is described in detail by using a specific embodiment, and certainly, the present invention is not limited to the following embodiment.

Because a GOP may include a GPB frame or may include a P frame, but regardless of whether the GOP includes a GPB frame or a P frame, inter-frame predictive coding manners of the GPB frame and the P frame are similar, the following embodiments are described by using a GOP that includes a GPB frame, a reference B frame, and a non-reference B frame as an example.

Embodiment 1

Figure 3A:
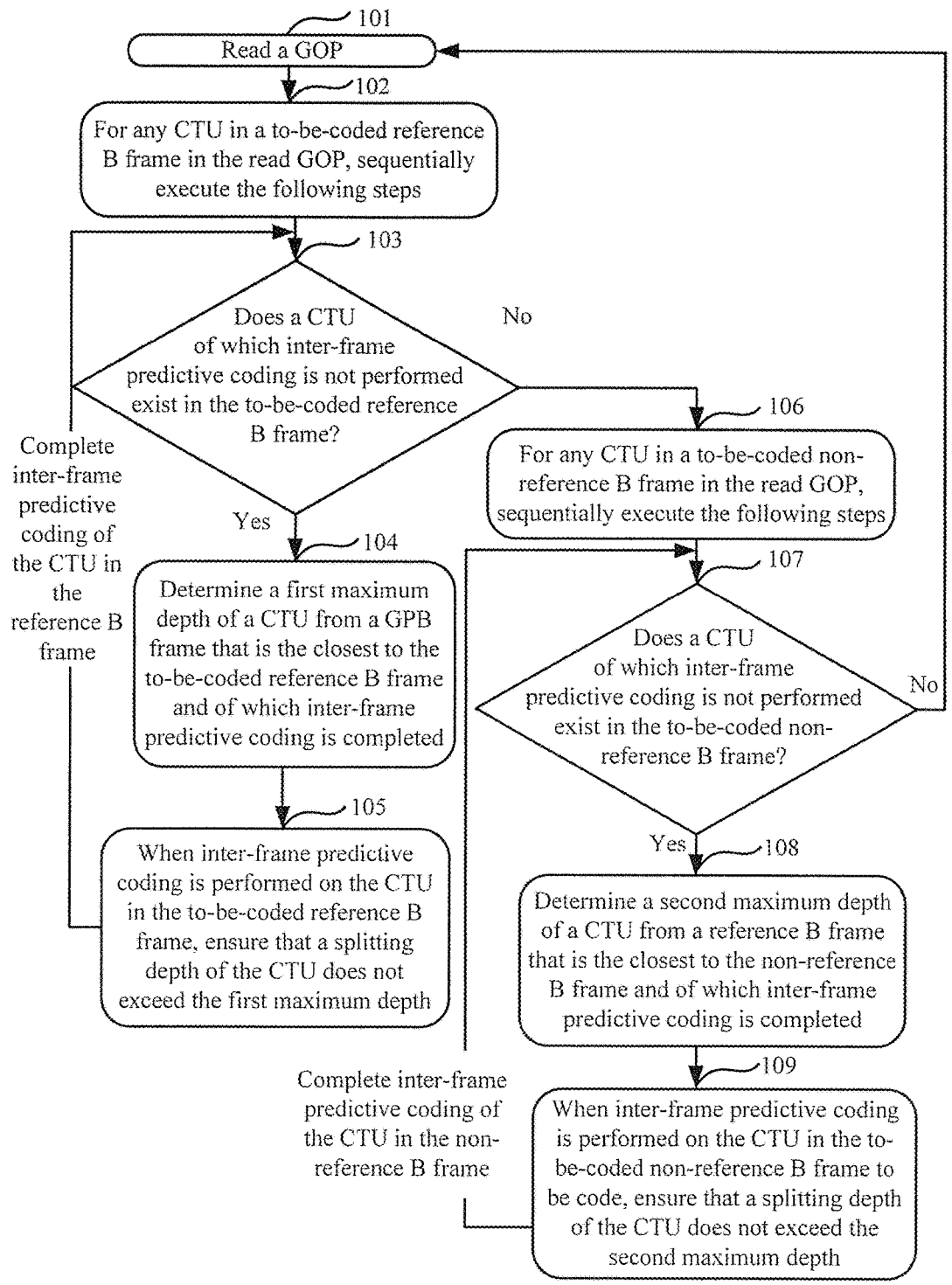

As shown in FIG. 3(a), FIG. 3(a) is a schematic diagram of steps of an inter-frame predictive coding method in Embodiment 1 of the present invention, and the method includes the following steps:

Step 101: Read a GOP.

Step 102: For any CTU in a to-be-coded reference B frame in the read GOP, sequentially execute the following steps.

In step 102, the reference B frame in the GOP may be determined by identifying a Flag value in a B frame.

Step 103: Determine whether a CTU of which inter-frame predictive coding is not performed exists in the to-be-coded reference B frame; if a CTU of which inter-frame predictive coding is not performed exists in the to-be-coded reference B frame, execute step 104; if a CTU of which inter-frame predictive coding is not performed does not exist in the to-be-coded reference B frame, execute step 106.

Step 104: Determine a CTU from a GPB frame that is the closest to the to-be-coded reference B frame in the current GOP and of which inter-frame predictive coding is completed, and determine a first maximum depth of the CTU.

The CTU determined from the GPB frame and the CTU in the to-be-coded reference B frame are in a same position in their respective frames.

In the solution of Embodiment 1, if a GOP includes only one GPB frame, inter-frame predictive coding needs to be performed on the GPB frame first. Therefore, in step 103, a CTU and a first maximum depth of the CTU may be determined from the GPB frame. If a GOP includes multiple GPB frames, in step 103, if at least one GPB frame of which inter-frame predictive coding is completed exists in the same GOP, a GPB frame that is the closest to a to-be-coded reference B frame may be determined from the at least one GPB frame, and then a CTU and a first maximum depth of the CTU are determined from the determined GPB frame.

Step 105: When inter-frame predictive coding is performed on the CTU in the to-be-coded reference B frame, that a splitting depth of the CTU does not exceed the first maximum depth, and after the inter-frame predictive coding of the CTU is completed, go to step 103.

Assuming that the first maximum depth is 2 and the CTU in the to-be-coded reference B frame is a 64×64 pixel block, when inter-frame predictive coding is performed on the CTU in the to-be-coded reference B frame, first, a mode decision is performed on the 64×64 CTU, inter-frame predictive coding is performed on the 64×64 CTU in a mode with a minimum cost value according to a mode decision result, and whether the 64×64 CTU needs to be further split is determined. An optional determining manner is as follows: After the mode decision is performed on the 64×64 CTU, whether the mode with the minimum cost value is a SKIP mode is determined; if it is determined that the mode with the minimum cost value is the SKIP mode, the 64×64 CTU may not be further split, and an inter-frame predictive coding process of the CTU is completed, and in this case, a maximum depth of the CTU is 0; if it is determined that the mode with the minimum cost value is not the SKIP mode, the CTU needs to be split into four 32×32 CUs, and after a mode decision and inter-frame predictive coding are performed on each 32×32 CU, whether to perform further splitting is determined in the foregoing determining manner, and so on. However, for a 16×16 CU (in this case, a depth corresponding to the CU is 2), after the mode decision and inter-frame predictive coding are completed, whether to perform further splitting does not need to be determined, and splitting of the CTU is terminated directly.

Optionally, when a mode decision is performed on a CU with each depth (including a CTU with a depth of 0), several mode operation processes may be skipped in some cases. For example, when a mode decision is performed on a 64×64 CTU, first, a mode operation of the SKIP mode is performed; if a cost value obtained after the mode operation of the SKIP mode is less than 1.5 times of an average cost value, when further mode operations are performed on the 64×64 CTU, mode operations of an inter-frame 2N×2N mode, an inter-frame N×N mode, an intra-frame 2N×2N mode, and an intra-frame N×N mode may be skipped (that is, when the mode decision is performed, the mode operations of the inter-frame 2N×2N mode, the inter-frame N×N mode, the intra-frame 2N×2N mode, and the intra-frame N×N mode are not performed), so that an objective of reducing a quantity of mode operations is achieved. In a frame being coded in which CTUs of which inter-frame predictive coding is performed are located, when mode decisions with a depth of 0 are performed on CTUs of which inter-frame predictive coding is completed, if modes with minimum cost values are the SKIP mode, the average cost value is an average value of these minimum cost values.

By using the solution of step 101 to step 105, an objective of optimizing inter-frame predictive coding of the reference B frame may be achieved, and complexity of an inter-frame predictive coding process of the reference B frame is reduced, that is, complexity of an entire HEVC coding process is reduced.

Preferably, in addition to the optimization of the inter-frame predictive coding of the reference B frame, inter-frame predictive coding of a non-reference B frame in the GOP may also be optimized. In the optimization of the inter-frame predictive coding of the non-reference B frame, reference needs to be made to an inter-frame predictive coding result of a reference B frame that is highly correlated with the non-reference B frame. Therefore, after the inter-frame predictive coding of the reference B frame is completed in step 103 to step 105, the following steps of performing inter-frame predictive coding on the non-reference B frame may be further included.

Step 106: For any CTU in a to-be-coded non-reference B frame in the read GOP, sequentially execute the following steps.

Step 107: Determine whether a CTU of which inter-frame predictive coding is not performed exists in the to-be-coded non-reference B frame; if a CTU of which inter-frame predictive coding is not performed exists in the to-be-coded non-reference B frame, execute step 108; if a CTU of which inter-frame predictive coding is not performed does not exist in the to-be-coded non-reference B frame, when inter-frame predictive coding of all frames in the currently read GOP is completed, continue to read a next GOP, or when a frame of which inter-frame predictive coding is not completed exists in the currently read GOP, continue to perform inter-frame predictive coding according to the solution of Embodiment 1.

Step 108: Determine a CTU from a reference B frame that is the closest to the to-be-coded non-reference B frame in the current GOP and of which inter-frame predictive coding is completed, and determine a second maximum depth of the CTU.

The CTU determined from the reference B frame and the CTU in the to-be-coded non-reference B frame are in a same position in their respective frames.

Step 109: When inter-frame predictive coding is performed on the CTU in the to-be-coded non-reference B frame, that a splitting depth of the CTU does not exceed the second maximum depth, and after the inter-frame predictive coding of the CTU is completed, go to step 107.

By using the solution of step 106 to step 109, an objective of optimizing the inter-frame predictive coding of the non-reference B frame may be achieved, and complexity of an inter-frame predictive coding process of the non-reference B frame is reduced, and the complexity of the entire HEVC coding process is further reduced.

Preferably, in the solution of Embodiment 1 of the present invention, inter-frame predictive coding of a GPB frame in the GOP may also be optimized. If there is only one GPB frame in the GOP, a to-be-coded GPB frame is a first frame on which inter-frame predictive coding is performed, that is, inter-frame predictive coding is performed on the GPB frame after step 101 and before step 102. If there are multiple GPB frames in the GOP, one of the GPB frames should be a first frame on which inter-frame predictive coding is performed, and an order of performing inter-frame predictive coding on other GPB frames may be determined according to a configuration information of a configuration file. In Embodiment 1 of the present invention, a case in which a to-be-coded GPB frame is not a first frame on which inter-frame predictive coding is performed and a case in which a to-be-coded GPB frame is a first frame on which inter-frame predictive coding is performed in a GOP are described separately.

1. Assuming that a to-be-coded GPB frame is not a first frame on which inter-frame predictive coding is performed in a GOP, that is, a GPB frame of which inter-frame predictive coding is completed exists in the current GOP, an inter-frame predictive coding process of the to-be-coded GPB frame is shown in FIG. 3(b)A, FIG. 3(b)B, FIG. 3(b)C, and includes the following steps:

Step A1: Determine a to-be-coded GPB frame; determine whether a CTU of which inter-frame predictive coding is not performed exists in the to-be-coded GPB frame; if a CTU of which inter-frame predictive coding is not performed exists in the to-be-coded GPB frame, execute step A2; if a CTU of which inter-frame predictive coding is not performed does not exist in the to-be-coded GPB frame, execute step 102.

It should be noted that, because the to-be-coded GPB frame is not the first GPB frame in the GOP, the to-be-coded GPB frame may be coded after the first GPB frame, or may be coded after a reference B frame or a non-reference B frame. An order of coding a non-first GPB frame is not limited in Embodiment 1 of the present invention.

In addition, after the inter-frame predictive coding of the non-first GPB frame is completed, if a frame of which inter-frame predictive coding is not performed still exists in the current GOP, inter-frame predictive coding of the frame may continue to be performed on the frame according to the solution of Embodiment 1 of the present invention. Step A1 is described by us ing an example in which inter-frame predictive coding is performed on a reference B frame after inter-frame predictive coding of a non-first GPB frame is completed. After the inter-frame predictive coding of the non-first GPB frame is completed, if inter-frame predictive coding of all frames in the current GOP is completed, a next GOP may continue to be read.

Step A2: Determine a CTU and a third maximum depth of the CTU from a GPB frame that is in the current GOP and of which inter-frame predictive coding is completed.

Assuming that before inter-frame predictive coding is performed on the to-be-coded GPB frame, at least one GPB frame of which inter-frame predictive coding is completed exists in the same GOP, in step A2, a CTU and a third maximum depth of the CTU are determined from any GPB frame in the at least one GPB frame. Optionally, a CTU of a first GPB frame and a third maximum depth of the CTU may be determined from GPB frames of which inter-frame predictive coding is completed.

Step A3: When inter-frame predictive coding is performed on the CTU in the to-be-coded GPB frame, that a splitting depth of the CTU does not exceed the third maximum depth, and after the inter-frame predictive coding of the CTU is completed, go to step A1.

2. Assuming that a to-be-coded GPB frame is a first to-be-coded frame in a GOP, that is, no GPB frame of which inter-frame predictive coding is completed exists in the current GOP, an inter-frame predictive coding process of the to-be-coded GPB frame is shown in FIG. 3(c)A, FIG. 3(c)B, FIG. 3(c)C, and includes the following steps:

Step B1: Determine a to-be-coded GPB frame; determine whether a CTU of which inter-frame predictive coding is not performed exists in the to-be-coded GPB frame; if yes, execute step B2; otherwise, execute step 102.

It should be noted that, because the to-be-coded GPB frame is a first frame on which an inter-frame predictive coding operation is performed in the GOP, after the inter-frame predictive coding of the to-be-coded GPB frame is completed, inter-frame predictive coding may be performed on a reference B frame; if a GPB frame of which inter-frame predictive coding is not performed still exists in the GOP, after the inter-frame predictive coding of the to-be-coded GPB frame is completed, an inter-frame predictive coding operation may be performed on other GPB frames in the GOP. Step B1 is described by using an example in which inter-frame predictive coding is performed on a reference B frame.

Step B2: Determine a CTU and a fourth maximum depth of the CTU from a GPB frame in a previous GOP.

Preferably, if there are multiple GPB frames in the previous GOP, the CTU determined in step B2 is a CTU in a first GPB frame in the previous GOP. A reason for doing this is as follows: When a coder reads a previous GOP, a finally read frame is a GPB frame, but when inter-frame predictive coding is performed, a finally read GPB frame is a first frame on which inter-frame predictive coding is performed. When inter-frame predictive coding is performed on the to-be-coded GPB frame in the currently read GOP, viewed from an order of frames in a video stream, in the previous GOP, a GPB frame that is the closest to the to-be-coded GPB frame is the finally read GPB frame in the previous GOP (namely, the first GPB frame on which inter-frame predictive coding is performed in the previous GOP). Therefore, when inter-frame predictive coding is performed on the CTU in the to-be-coded GPB frame, reference is made to a CTU in a same position in the first GPB frame on which inter-frame predictive coding is performed and that has a highest correlation in the previous GOP.

Step B3: When inter-frame predictive coding is performed on the CTU in the to-be-coded GPB frame, that a splitting depth of the CTU does not exceed the fourth maximum depth, and after the inter-frame predictive coding of the CTU is completed, go to step B1.

By using the solutions of step A1 to step A3 and step B1 to step B3, an objective of optimizing the inter-frame predictive coding of the GPB frame may be achieved, and complexity of an inter-frame predictive coding process of the GPB frame is reduced, and the complexity of the entire HEVC coding process is further reduced.

In addition, if the GOP includes a P frame other than a GPB frame, a process of optimizing inter-frame predictive coding of the P frame is also as shown in the solutions of step A1 to step A3 and step B1 to step B3, and is specifically:

if a P frame of which inter-frame predictive coding is completed exists in the current group of pictures, for any CTU in a to-be-coded P frame in the current group of pictures, determining a fifth maximum depth of a CTU from the P frame of which inter-frame predictive coding is completed, where the determined CTU and the CTU in the to-be-coded P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determining a sixth maximum depth of a CTU from a P frame in the previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

It should be noted that the first maximum depth, the second maximum depth, the third maximum depth, the fourth maximum depth, the fifth maximum depth, and the sixth maximum depth in Embodiment 1 of the present invention do not have a necessarily same or different association relationship, and that "the first" to "the sixth" are used to distinguish between maximum depths of different CTUs.

In the solution of Embodiment 1 of the present invention, when inter-frame predictive coding is performed on a GPB frame, a correlation with a first GPB frame in a same GOP or a GPB frame in a previous GOP is used; when inter-frame predictive coding is performed on a reference B frame, a correlation with a GPB frame in a same GOP is used; when inter-frame predictive coding is performed on a non-reference B frame, a correlation with a reference B frame in a same GOP is used. The inter-frame predictive coding optimized by using the solution of Embodiment 1 of the present invention, in comparison with conventional inter-frame predictive coding performed on a frame in an HM manner of HEVC, may shorten a coding time by 57.36% based on the following emulation conditions in a case in which an overall performance loss is 0.3%.

The emulation conditions are: five GOPs including frames whose resolutions are 1080p, four GOPs including frames whose resolutions are WVGA (800×480), four GOPs including frames whose resolutions are WQVGA (480×272), four GOPs including frames whose resolutions are 720p, four GOPs including frames whose resolutions are 4CIF (704×576), and four GOPs including frames whose resolutions are QVGA (240×320). These 25 GOPs are coded by using the inter-frame predictive coding method in Embodiment 1 of the present invention, and inter-frame predictive coding is performed by using the HM manner of HEVC.

In the following, the solution of Embodiment 1 of the present invention is described in detail by using a specific embodiment.

Embodiment 2

Assuming that in Embodiment 2 of the present invention, inter-frame predictive coding is performed on frames in three 4-frame GOPs, where each GOP includes one GPB frame, one reference B frame, and two non-reference B frames, before inter-frame predictive coding is performed, first, an I frame is coded, and then each GOP is read sequentially, and inter-frame predictive coding is performed on frames in the read GOP. A specific process is as follows:

Step 1: Read a first GOP.

Step 2: Perform coding on a GPB frame in the first GOP, where a specific coding mode is as follows:

Inter-frame predictive coding is performed on each CTU in the GPB frame. A CTU (which may be called a $CTU_{\_GPB\ frame\_first\ GOP}$) in the GPB frame is used as an example for description. An inter-frame predictive coding manner of another CTU in the GPB frame is the same as processing of the $CTU_{\_GPB\ frame\_first\ GOP}$.

Using a $CTU_{\_GPB\ frame\_first\ GOP}$ that is a 64×64 pixel block as an example, first, by using a relatively complex sum of absolute transformed differences (SATD) algorithm, mode operations of eight modes are performed on the $CTU_{\_GPB\ frame\_first\ GOP}$ whose pixel block is 64×64, and a mode decision is performed by using cost values of mode operation results, and further, inter-frame predictive coding is performed on the 64×64 $CTU_{\_GPB\ frame\_first\ GOP}$ in a mode determined according to a decision result. Then, the 64×64 $CTU_{\_GPB\ frame\_first\ GOP}$ is split into four 32×32 CUs, and a mode decision and inter-frame predictive coding are performed in the foregoing manner, and so on, until the inter-frame predictive coding of the $CTU_{\_GPB\ frame\_first\ GOP}$ is completed.

Preferably, when mode decisions with depths of 0 to (a preset maximum depth minus 1) are performed on the $CTU_{\_GPB\ frame\_first\ GOP}$ mode operations of an inter-frame N×2N mode and an inter-frame 2N×N mode may be skipped, and mode decisions are performed by using remaining modes; when a mode decision with a depth of the preset maximum depth is performed on the $CTU_{\_GPB\ frame\_first\ GOP}$, mode operations of the inter-frame N×2N mode and the inter-frame 2N×N mode are performed. An objective of doing this is as follows: When the mode decisions with the depths of 0 to (the preset maximum depth minus 1) are performed on the $CTU_{\_GPB\ frame\_first\ GOP}$, even if the mode operations of the inter-frame N×2N mode and the inter-frame 2N×N mode are skipped, a frame performance loss is not great, but complexity of the inter-frame predictive coding of the $CTU_{\_GPB\ frame\_first\ GOP}$ may be reduced effectively; however, when the mode decision with the depth of the preset maximum depth is performed on the $CTU_{\_GPB\ frame\_first\ GOP}$, if the mode operations of the inter-frame N×2N mode and the inter-frame 2N×N mode are skipped, a problem of an excessive picture detail loss is caused, and therefore those mode operations are preferably performed.

The preset maximum depth may be configured by a coder, for example, the preset maximum depth is set to 3; or it may be a maximum depth that is calculated by a coder according to a size of a configured CTU. For example, if the configured CTU is a 64×64 pixel block, when an 8×8 CU is obtained by splitting the CTU, a depth corresponding to the CU is 3, and in this case, a maximum depth preset for the CTU is 3. For another example, if the configured CTU is a 128×128 pixel block, when an 8×8 CU is obtained by splitting the CTU, a depth corresponding to the CU is 4, and in this case, a maximum depth preset for the CTU is 4.

Because the frame on which inter-frame predictive coding is performed in step 2 is a first GPB frame in the first GOP, and no previous frame may be used as a reference frame for the GPB frame, inter-frame predictive coding may be performed on the GPB frame in the first GOP in a conventional manner.

Step 3: Perform coding on a reference B frame in the first GOP, where a specific coding manner is as follows:

Inter-frame predictive coding is performed on each CTU in the reference B frame. A CTU (which may be called a $CTU_{\_reference\ B\ frame}$) in the reference B frame is used as an example for description. An inter-frame predictive coding manner of another CTU in the reference B frame is the same as processing of the $CTU_{\_reference\ B\ frame}$.

(1) Determine a CTU from a GPB frame in the first GOP according to a position of a $CTU_{\_reference\ B\ frame}$ in a reference B frame, where the CTU is called a $CTU_{\_GPB\ frame\_first\ GOP}$, and the determined $CTU_{\_GPB\ frame\_first\ GOP}$ and the $CTU_{\_reference\ B\ frame}$ are in a same position in their respective frames.

(2) Determine a maximum depth D1 of the $CTU_{\_GPB\ frame\ first\ GOP}$.

The maximum depth d1 of the $CTU_{\_GPB\ frame\_first\ GOP}$ may be determined after inter-frame predictive coding is performed on the $CTU_{\_GPB\ frame\_first\ GOP}$ in step 2.

(3) When inter-frame predictive coding is performed on the $CTU_{\_reference\ B\ frame}$, perform a mode operation with each depth by using a simple sum of absolute differences (SAD) algorithm, perform a mode decision by using a cost value of a mode operation result, and perform inter-frame predictive coding, where a splitting depth of the $CTU_{\_reference\ B\ frame}$ does not exceed the maximum depth d1.

For example, if the maximum depth d1 is 2, and the $CTU_{\_reference\ B\ frame}$ is a 64×64 pixel block, when inter-frame predictive coding is performed on the $CTU_{\_reference\ B\ frame}$, first, a mode decision and inter-frame predictive coding are performed on the 64×64 $CTU_{\_reference\ B\ frame}$; then four 32×32 CUs are obtained by splitting the $CTU_{\_reference\ B\ frame}$, and a mode decision and inter-frame predictive coding are performed on the 32×32 CUs separately; and then the 32×32 CU is further split, and a mode decision and inter-frame predictive coding are performed on each 16×16 CU that is obtained by splitting. In this case, a minimum CU in the $CTU_{\_reference\ B\ frame}$ is a 16×16 CU, and a depth corresponding to the 16×16 CU reaches 2, which is equal to the maximum depth d1. Therefore, the 16×16 CU is not further split, and the inter-frame predictive coding process of the $CTU_{\_reference\ B\ frame}$ is completed.

Certainly, in the foregoing mode decision process in each step, if it is determined that a mode with a minimum cost value is a SKIP mode, even if a 16×16 CU is not obtained by splitting, further splitting may not be performed, and the inter-frame predictive coding process of the $CTU_{\_reference\ B\ frame}$ is completed.

By making reference to a correlation between a reference B frame and a GPB frame in a same GOP, when inter-frame predictive coding is performed on a CTU in the reference B frame, a quantity of mode decisions may be reduced, and complexity of an inter-frame predictive coding process is reduced.

Preferably, if the maximum depth d1 is equal to the preset maximum depth, when inter-frame predictive coding is performed on the $CTU_{\_reference\ B\ frame}$, a mode decision process with a depth of 0 may be skipped, that is, a mode decision and inter-frame predictive coding are not performed on the 64×64 $C_{\_reference\ B\ frame}$, but instead, the 64×64 $CTU_{\_reference\ B\ frame}$ is first split into four 32×32 CUs. An advantage of doing this is as follows: Because the maximum splitting depth d1 of the $CTU_{\_GPB\ frame\_first\ GOP}$ is equal to the preset maximum depth, a maximum splitting depth of a $CTU_{\_reference\ B\ frame}$ highly correlated with the $CTU_{\_GPB\ frame\_first\ GOP}$ is also great, for example, equal to the preset maximum depth or equal to (the preset maximum depth minus 1). In this case, even if the mode decision process with the depth of 0 is skipped, little influence is caused to performance of the reference B frame, and complexity of an inter-frame predictive coding process may be reduced effectively.

Preferably, when inter-frame predictive coding is performed on the $CTU_{\_reference\ B\ frame}$, for a $CTU_{\_reference\ B\ frame}$ with any depth, when a mode decision is performed, mode operations of the inter-frame N×2N mode and the inter-frame 2N×N mode may be skipped, and a mode decision is performed by using the remaining modes. An advantage of doing this is as follows: Because B frames (including a reference B frame and a non-reference B frame) are highly tolerable to a performance loss, to reduce complexity of inter-frame predictive coding as much as possible, the mode operations of the inter-frame N×2N mode and the inter-frame 2N×N mode may be skipped.

Step 4: Perform coding on a non-reference B frame in the first GOP, where a specific coding manner is as follows:

Inter-frame predictive coding is performed on each CTU in the non-reference B frame. A CTU (which may be called a $CTU_{\_non-reference\ B\ frame}$) in the non-reference B frame is used as an example for description. An inter-frame predictive coding manner of another CTU in the non-reference B frame is the same as processing of the $CTU_{\_non-reference\ B\ frame}$.

(1) According to a position of a $CTU_{\text{non-reference B frame}}$ in a non-reference B frame determine a CTU that is in a same position in a reference B frame in the first GOP as the $CTU_{\text{non-reference B frame}}$, assuming that the CTU is a $CTU_{\text{reference B frame}}$.

(2) Determine a maximum depth d2 of the $CTU_{\text{reference B frame}}$.

The maximum depth d2 of the $CTU_{\text{reference B frame}}$ may be determined after inter-frame predictive coding is performed on the reference B frame in step 3.

(3) When inter-frame predictive coding is performed on the $CTU_{\text{non-reference B frame}}$, perform a mode operation with each depth by using a SAD algorithm, perform a mode decision by using a cost value of a mode operation result, and perform inter-frame predictive coding, where a splitting depth of the $CTU_{\text{non-reference B frame}}$ does not exceed the maximum depth d2.

Preferably, if the maximum depth d2 is equal to the preset maximum depth or equal to (the preset maximum depth minus 1), when inter-frame predictive coding is performed on the $CTU_{\text{non-reference B frame}}$, a mode decision process with a depth of 0 may be skipped. An advantage of doing this is as follows: Because the maximum depth d2 of the $CTU_{\text{reference B frame}}$ is equal to the preset maximum depth or equal to (the preset maximum depth minus 1), a maximum depth of a $CTU_{\text{reference B frame}}$ highly correlated with the $CTU_{\text{reference B frame}}$ is also great, for example, equal to the preset maximum depth or equal to (the preset maximum depth minus 1). In this case, even if the mode decision with the depth of 0 is skipped, little influence is caused to performance of the non-reference B frame, and complexity of an inter-frame predictive coding process may be reduced effectively.

In addition, in step 3, the mode decision process of the $CTU_{\text{reference B frame}}$ with the depth of 0 is skipped only when the maximum depth d1 is equal to the preset maximum depth; however, in step 4, the mode decision process of the $CTU_{\text{non-reference B frame}}$ with the depth of 0 may be skipped when the maximum depth d2 is equal to the preset maximum depth or equal to (the preset maximum depth minus 1). Because the $CTU_{\text{reference B frame}}$ is a reference CTU for the $CTU_{\text{non-reference B frame}}$ in the same GOP, a coding requirement on the $CTU_{\text{reference B frame}}$ is higher than that on the $CTU_{\text{non-reference B frame}}$. When the maximum depth d1 is equal to the preset maximum depth, even if the mode decision process of the $CTU_{\text{reference B frame}}$ with the depth of 0 is skipped, little influence is caused to the performance of the reference B frame. However, when the maximum depth d1 is equal to the preset maximum depth minus 1, if the mode decision of the $CTU_{\text{reference B frame}}$ with the depth of 0 is still skipped, particular influence may be caused to the performance of the reference B frame, and further, influence is caused to a subsequent inter-frame coding process of the $CTU_{\text{non-reference B frame}}$. However, the $CTU_{\text{non-reference B frame}}$ may not become a reference CTU for other CTUs. Therefore, even if the maximum depth d2 is equal to the preset maximum depth minus 1, the mode decision with the depth of 0 may also be skipped in an inter-frame predictive coding process of the $CTU_{\text{non-reference B frame}}$.

Step 5: After the coding of each frame in the first GOP is completed, read a second GOP.

Step 6: Perform coding on a GPB frame in the second GOP, where a specific coding mode is as follows:

(1) According to a position of a CTU (which is called a $CTU_{\text{GPB frame-second GOP}}$) in a GPB frame in the second GOP, determine a $CTU_{\text{GPB frame-first GOP}}$ that is in a same position in a GPB frame in the first GOP as the $CTU_{\text{GPB frame-second GOP}}$.

(2) Determine a maximum depth d3 of the $CTU_{\text{GPB frame-first GOP}}$.

The maximum depth d3 of the $CTU_{\text{GPB frame-first GOP}}$ may be determined after inter-frame predictive coding is performed on the GPB frame in the first GOP in step 2.

It should be noted that reference is made to the GPB frame in the first GOP when inter-frame predictive coding is performed on the GPB frame in the second GOP, and that reference is also made to the GPB frame in the first GOP when inter-frame predictive coding is performed on the reference B frame in the first GOP. Therefore, the maximum depth d1 and the maximum depth d3 in this embodiment are the same.

(3) When inter-frame predictive coding is performed on the $CTU_{\text{GPB frame-second GOP}}$, perform a mode operation with each depth by using a SAD algorithm, perform a mode decision by using a cost value of a mode operation result, and perform inter-frame predictive coding, where a splitting depth of the $CTU_{\text{GPB frame-second GOP}}$ does not exceed the maximum depth d3.

Preferably, if the maximum depth d3 is equal to the preset maximum depth, when inter-frame predictive coding is performed on the $CTU_{\text{GPB frame-second GOP}}$, a mode decision process with a depth of 0 may be skipped. An advantage of doing this is as follows: When the maximum depth d3 of the $CTU_{\text{GPB frame-first GOP}}$ is equal to the preset maximum depth, a maximum depth of a $CTU_{\text{GPB frame-second GOP}}$ highly correlated with the $CTU_{\text{GPB frame-first GOP}}$ is also great, for example, equal to the preset maximum depth or equal to (the preset maximum depth minus 1). In this case, even if the mode decision process with the depth of 0 is skipped, little influence is caused to performance of the GPB frame in the second GOP, and complexity of an inter-frame predictive coding process may be reduced effectively.

Preferably, when inter-frame predictive coding is performed on the $CTU_{\text{GPB frame-second GOP}}$, in a mode decision process of the $CTU_{\text{GPB frame-second GOP}}$ with depths of 0 to (the preset maximum depth minus 1), mode operations of the inter-frame N×2N mode and the inter-frame 2N×N mode may be skipped; in a mode decision process of the $CTU_{\text{GPB frame-second GOP}}$ with the depth of the preset maximum depth, mode operations of the inter-frame N×2N mode and the inter-frame 2N×N mode are performed. An advantage of doing this is as follows: In the mode decision process with the depths of 0 to (the preset maximum depth minus 1), even if mode operations of the inter-frame N×2N mode and the inter-frame 2N×N mode are skipped, a performance loss of the GPB frame is not great, but complexity of inter-frame predictive coding may be reduced effectively. However, in the mode decision process of the $CTU_{\text{GPB frame-second GOP}}$, with the depth of the preset maximum depth, if mode operations of the inter-frame N×2N mode and the inter-frame 2N×N mode are skipped, a problem of an excessive detail loss of the GPB frame is caused, and therefore those mode operations are preferably performed.

Then, inter-frame predictive coding continues to be performed on a reference B frame and a non-reference B frame in the second GOP according to the same manners in step 3 and step 4. Then, a third GOP may be read, and processed according to the inter-frame predictive coding manner of each frame in the second GOP.

In Embodiment 2, the solution of the present invention is described by using three GOPs as an example. In a case in which there are n (n is greater than 3) GOPs, processing is the same as processing of the three GOPs, and is not further described herein.

On a basis of Embodiment 1, further optimization is made in the solution of Embodiment 2 of the present invention: When inter-frame predictive coding is performed on a GPB frame, in mode decisions with depths of 0 to (a preset maximum depth minus 1) that are performed on a CTU in the GPB frame by using an SATD algorithm, mode operations of an inter-frame N×2N mode and an inter-frame 2N×N mode are skipped; in a mode decision of the CTU with a depth of the preset maximum depth, mode operations of the inter-frame N×2N mode and the inter-frame 2N×N mode are performed; when a depth of a CTU in a reference GPB frame is equal to the preset maximum depth, a mode decision process with a depth of 0 is skipped. When inter-frame predictive coding is performed on a reference B frame, in mode decisions with all depths that are performed on a CTU in the reference B frame by using the SAD algorithm, mode operations of the inter-frame N×2N mode and the inter-frame 2N×N mode are skipped; when a depth of the CTU in the reference GPB frame is equal to the preset maximum depth, a mode decision process with a depth of 0 is skipped. When inter-frame predictive coding is performed on a non-reference B frame, in mode decisions with all depths that are performed on a CTU in the non-reference B frame by using the SAD algorithm, mode operations of the inter-frame N×2N mode and the inter-frame 2N×N mode are skipped; when a depth of the CTU in the reference B frame is equal to the preset maximum depth or equal to (the preset maximum depth minus 1), a mode decision process with a depth of 0 is skipped.

The inter-frame predictive coding optimized by using the solution of Embodiment 2 of the present invention, in comparison with conventional inter-frame predictive coding performed in an HM manner of HEVC, may shorten a coding time by 77.27% based on the emulation conditions involved in Embodiment 1 in a case in which an overall performance loss is 3.1%.

Embodiment 3

Figure 4:
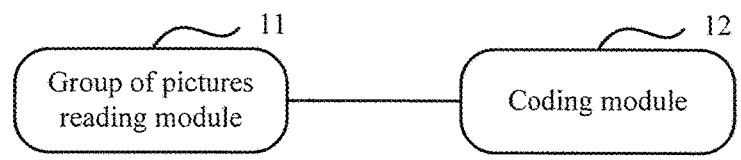
FIG. 4 is a schematic structural diagram of a coder according to Embodiment 3 of the present invention.

In Embodiment 3 of the present invention, a coder pertaining to a same invention conception as Embodiment 1 and Embodiment 2 is described. As shown in FIG. 4, the coder includes a group of pictures reading module 11 and a coding module 12, where:

the group of pictures reading module 11 is configured to sequentially read groups of pictures; and the coding module 12 is configured to perform the following inter-frame predictive coding on frames in any group of pictures:

for any CTU in a to-be-coded reference B frame in a current group of pictures, determining a first maximum depth of a CTU from a GPB frame or P frame that is the closest to the to-be-coded reference B frame in the current group of pictures and of which inter-frame predictive coding is completed, where the determined CTU and the CTU in the to-be-coded reference B frame are in a same position in their respective frames; and when inter-frame predictive coding is performed on the CTU in the to-be-coded reference B frame, that a splitting depth of the CTU does not exceed the first maximum depth.

Further, the coding module 12 is further configured to: if the first maximum depth is equal to a preset maximum depth, skip a mode decision process with a depth of 0 when inter-frame predictive coding is performed on the CTU in the to-be-coded reference B frame; because a quantity of decisions performed on the reference B frame is reduced, an inter-frame predictive coding process of the reference B frame may be simplified, and an inter-frame predictive coding time is shortened.

Further, the coding module 12 is further configured to: when inter-frame predictive coding is performed on the CTU in the to-be-coded reference B frame, in a mode decision process of the CTU with any depth, skip mode operations of an inter-frame N×2N mode and an inter-frame 2N×N mode, and perform mode operations of other modes by using a sum of absolute differences SAD algorithm; because mode operations of the reference B frame are reduced, the inter-frame predictive coding process of the reference B frame may be simplified, and the inter-frame predictive coding time is shortened.

Further, the coding module 12 is further configured to: for any CTU in a to-be-coded non-reference B frame in the current group of pictures, determine a second maximum depth of a CTU from a reference B frame that is the closest to the to-be-coded non-reference B frame in the current group of pictures and of which inter-frame predictive coding is completed, where the determined CTU and the CTU in the to-be-coded non-reference B frame are in a same position in their respective frames; and when inter-frame predictive coding is performed on the CTU in the to-be-coded non-reference B frame, that a splitting depth of the CTU does not exceed the second maximum depth.

Further, the coding module 12 is further configured to: if the second maximum depth is equal to the preset maximum depth or the preset maximum depth minus 1, skip a mode decision process with a depth of 0 when inter-frame predictive coding is performed on the CTU in the to-be-coded non-reference B frame; because a quantity of decisions performed on the non-reference B frame is reduced, an inter-frame predictive coding process of the non-reference B frame may be simplified, and an inter-frame predictive coding time is shortened.

Further, the coding module 12 is configured to: when inter-frame predictive coding is performed on the CTU in the to-be-coded non-reference B frame, in a mode decision process of the CTU with any depth, skip mode operations of the inter-frame N×2N mode and the inter-frame 2N×N mode, and perform mode operations of other modes by using the SAD algorithm; because mode operations of the non-reference B frame are reduced, the inter-frame predictive coding process of the non-reference B frame may be simplified, and the inter-frame predictive coding time is shortened.

Further, the coding module 12 is further configured to: if a GPB frame of which inter-frame predictive coding is completed exists in the current group of pictures, for any CTU in a to-be-coded GPB frame in the current group of pictures, determine a third maximum depth of a CTU from the GPB frame of which inter-frame predictive coding is completed, where the determined CTU and the CTU in the to-be-coded GPB frame are in a same position in their respective frames; and when inter-frame predictive coding is performed on the CTU in the to-be-coded GPB frame, that a splitting depth of the CTU does not exceed the third maximum depth; or if no GPB frame of which inter-frame predictive coding is completed exists in the current group of pictures, for any CTU in a to-be-coded GPB frame in the current group of pictures, determine a fourth maximum depth of a CTU from a GPB frame in a previous group of pictures, where the determined CTU and the CTU in the to-be-coded GPB frame in the current group of pictures are in a same position in their respective frames; and when inter-frame predictive coding is performed on the CTU in the to-be-coded GPB frame, that a splitting depth of the CTU does not exceed the fourth maximum depth.

Further, the coding module 12 is further configured to: if the third maximum depth or the fourth maximum depth is equal to the preset maximum depth, skip a mode decision process with a depth of 0 when inter-frame predictive coding is performed on the CTU in the to-be-coded GPB frame; because a quantity of decisions performed on the GPB frame is reduced, an inter-frame predictive coding process of the GPB frame may be simplified, and an inter-frame predictive coding time is shortened.

Further, the coding module 12 is further configured to: when inter-frame predictive coding is performed on the CTU in the to-be-coded GPB frame, in mode decisions of the CTU with depths of 0 to the preset maximum depth minus 1, skip mode operations of the inter-frame N×2N mode and the inter-frame 2N×N mode, and perform a mode operation on the CTU by using a sum of absolute transformed differences SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm; because mode operations of the GPB frame are reduced, the inter-frame predictive coding process of the GPB frame may be simplified, and the inter-frame predictive coding time is shortened.

Further, the coding module 12 is further configured to: if a P frame of which inter-frame predictive coding is completed exists in the current group of pictures, for any CTU in a to-be-coded P frame in the current group of pictures, determine a fifth maximum depth of a CTU from the P frame of which inter-frame predictive coding is completed, where the determined CTU and the CTU in the P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determine a sixth maximum depth of a CTU from a P frame in a previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

Further, the coding module 12 is further configured to: if the fifth maximum depth or the sixth maximum depth is equal to the preset maximum depth, skip a mode decision process with a depth of 0 when inter-frame predictive coding is performed on the CTU in the to-be-coded P frame; because a quantity of decisions performed on the P frame is reduced, an inter-frame predictive coding process of the P frame may be simplified, and an inter-frame predictive coding time is shortened.

Further, the coding module 12 is further configured to: when inter-frame predictive coding is performed on the CTU in the to-be-coded P frame, in mode decisions of the CTU with depths of 0 to the preset maximum depth minus 1, skip mode operations of the inter-frame N×2N mode and the inter-frame 2N×N mode, and perform a mode operation on the CTU by using an SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm; because mode operations of the P frame are reduced, the inter-frame predictive coding process of the P frame may be simplified, and the inter-frame predictive coding time is shortened.

Embodiment 4

Figure 5:
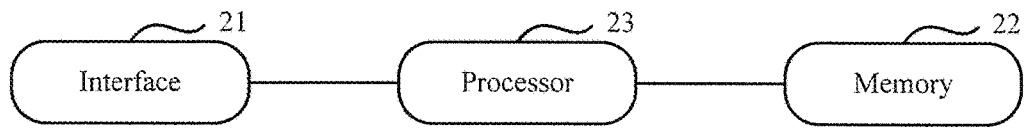
FIG. 5 is a schematic structural diagram of a coder according to Embodiment 4 of the present invention.

In Embodiment 4 of the present invention, another coder pertaining to a same invention conception as Embodiment 1 and Embodiment 2 is described. As shown in FIG. 5, the coder includes an interface 21, a memory 22, and a processor 23, where:

the interface 21 is configured to sequentially read groups of pictures;

the processor 23 is configured to perform the following inter-frame predictive coding on frames in any group of pictures:

for any CTU in a to-be-coded reference B frame in a current group of pictures, determining a first maximum depth of a CTU from a GPB frame or P frame that is the closest to the to-be-coded reference B frame in the current group of pictures and of which inter-frame predictive coding is completed, where the determined CTU and the CTU in the to-be-coded reference B frame are in a same position in their respective frames; and when inter-frame predictive coding is performed on the CTU in the to-be-coded reference B frame, that a splitting depth of the CTU does not exceed the first maximum depth; and the memory 22 is configured to store a maximum depth of each CTU in the GPB frame or P frame that is in the group of pictures and of which inter-frame predictive coding is completed.

Further, the processor 23 is further configured to: if the first maximum depth is equal to a preset maximum depth, skip a mode decision process with a depth of 0 when inter-frame predictive coding is performed on the CTU in the to-be-coded reference B frame; and the memory 22 is further configured to store the preset maximum depth.

Because a quantity of decisions performed on the reference B frame is reduced, an inter-frame predictive coding process of the reference B frame may be simplified, and an inter-frame predictive coding time is shortened.

Further, the processor 23 is further configured to: when inter-frame predictive coding is performed on the CTU in the to-be-coded reference B frame, in a mode decision process of the CTU with any depth, skip mode operations of an inter-frame N×2N mode and an inter-frame 2N×N mode, and perform mode operations of other modes by using a sum of absolute differences SAD algorithm; and the memory 22 is further configured to store multiple types of mode operation information.

Because mode operations of the reference B frame are reduced, the inter-frame predictive coding process of the reference B frame may be simplified, and the inter-frame predictive coding time is shortened.

Further, the processor 23 is further configured to: for any CTU in a to-be-coded non-reference B frame in the current group of pictures, determine a second maximum depth of a CTU from a reference B frame that is the closest to the to-be-coded non-reference B frame in the current group of pictures and of which inter-frame predictive coding is completed, where the determined CTU and the CTU in the to-be-coded non-reference B frame are in a same position in their respective frames; and when inter-frame predictive coding is performed on the CTU in the to-be-coded non-reference B frame, that a splitting depth of the CTU does not exceed the second maximum depth.

The memory 22 is further configured to store a maximum depth of each CTU in a reference B frame that is in the group of pictures and of which inter-frame predictive coding is completed.

Further, the processor 23 is further configured to: if the second maximum depth is equal to the preset maximum depth or the preset maximum depth minus 1, skip a mode decision process with a depth of 0 when inter-frame predictive coding is performed on the CTU in the to-be-coded non-reference B frame; because a quantity of decisions performed on the non-reference B frame is reduced, an inter-frame predictive coding process of the non-reference B frame may be simplified, and an inter-frame predictive coding time is shortened.

Further, the processor 23 is configured to: when inter-frame predictive coding is performed on the CTU in the to-be-coded non-reference B frame, in a mode decision process of the CTU with any depth, skip mode operations of the inter-frame N×2N mode and the inter-frame 2N×N mode, and perform mode operations of other modes by using the SAD algorithm; because mode operations of the non-reference B frame are reduced, the inter-frame predictive coding process of the non-reference B frame may be simplified, and the inter-frame predictive coding time is shortened.

Further, the processor 23 is further configured to: if a GPB frame of which inter-frame predictive coding is completed exists in the current group of pictures, for any CTU in a to-be-coded GPB frame in the current group of pictures, determine a third maximum depth of a CTU from the GPB frame of which inter-frame predictive coding is completed, where the determined CTU and the CTU in the to-be-coded GPB frame are in a same position in their respective frames; and when inter-frame predictive coding is performed on the CTU in the to-be-coded GPB frame, that a splitting depth of the CTU does not exceed the third maximum depth; or if no GPB frame of which inter-frame predictive coding is completed exists in the current group of pictures, for any CTU in a to-be-coded GPB frame in the current group of pictures, determine a fourth maximum depth of a CTU from a GPB frame in a previous group of pictures, where the determined CTU and the CTU in the to-be-coded GPB frame in the current group of pictures are in a same position in their respective frames; and when inter-frame predictive coding is performed on the CTU in the to-be-coded GPB frame, that a splitting depth of the CTU does not exceed the fourth maximum depth.

Further, the processor 23 is further configured to: if the third maximum depth or the fourth maximum depth is equal to the preset maximum depth, skip a mode decision process with a depth of 0 when inter-frame predictive coding is performed on the CTU in the to-be-coded GPB frame; because a quantity of decisions performed on the GPB frame is reduced, an inter-frame predictive coding process of the GPB frame may be simplified, and an inter-frame predictive coding time is shortened.

Further, the processor 23 is further configured to: when inter-frame predictive coding is performed on the CTU in the to-be-coded GPB frame, in mode decisions of the CTU with depths of 0 to the preset maximum depth minus 1, skip mode operations of the inter-frame N×2N mode and the inter-frame 2N×N mode, and perform a mode operation on the CTU by using a sum of absolute transformed differences SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm; because mode operations of the GPB frame are reduced, the inter-frame predictive coding process of the GPB frame may be simplified, and the inter-frame predictive coding time is shortened.

Further, the processor 23 is further configured to: if a P frame of which inter-frame predictive coding is completed exists in the current group of pictures, for any CTU in a to-be-coded P frame in the current group of pictures, determine a fifth maximum depth of a CTU from the P frame of which inter-frame predictive coding is completed, where the determined CTU and the CTU in the to-be-coded P frame are in a same position in their respective frames; and when inter-frame predictive coding is performed on the CTU in the to-be-coded P frame, that a splitting depth of the CTU does not exceed the fifth maximum depth; or if no P frame of which inter-frame predictive coding is completed exists in the current group of pictures, for any CTU in a to-be-coded P frame in the current group of pictures, determine a sixth maximum depth of a CTU from a P frame in a previous group of pictures, where the determined CTU and the CTU in the to-be-coded P frame in the current group of pictures are in a same position in their respective frames; and when inter-frame predictive coding is performed on the CTU in the to-be-coded P frame, that a splitting depth of the CTU does not exceed the sixth maximum depth.

Further, the processor 23 is further configured to: if the fifth maximum depth or the sixth maximum depth is equal to the preset maximum depth, skip a mode decision process with a depth of 0 when inter-frame predictive coding is performed on the CTU in the to-be-coded P frame; because a quantity of decisions performed on the P frame is reduced, an inter-frame predictive coding process of the P frame may be simplified, and an inter-frame predictive coding time is shortened.

Further, the processor 23 is further configured to: when inter-frame predictive coding is performed on the CTU in the to-be-coded P frame, in mode decisions of the CTU with depths of 0 to the preset maximum depth minus 1, skip mode operations of the inter-frame N×2N mode and the inter-frame 2N×N mode, and perform a mode operation on the CTU by using an SATD algorithm; or in a mode decision of the CTU with a depth of the preset maximum depth, perform mode operations of the inter-frame N×2N mode and the inter-frame 2N×N mode, and perform a mode operation on the CTU by using an SATD algorithm; because mode operations of the P frame are reduced, the inter-frame predictive coding process of the P frame may be simplified, and the inter-frame predictive coding time is shortened.

A person skilled in the art should understand that the embodiments of the present invention may be provided as a method, a system, or a computer program product. The present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

According to definitions in this specification, computer-readable media do not include computer-readable transitory media (transitory media), such as modulated data signals and carriers.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. An inter-frame predictive coding method, comprising:
   sequentially reading groups of pictures; and
   performing inter-frame predictive coding on frames in each group of pictures, wherein the inter-frame predictive coding is performed on frames in a current group of pictures by:
   for any first coding tree unit (CTU) in a to-be-coded reference B frame in the current group of pictures, determining a first maximum depth of a second CTU from a generalized P/B (GPB) frame or P frame that is the closest to the to-be-coded reference B frame in the current group of pictures and of which inter-frame predictive coding is completed, wherein the second CTU and the first CTU are in a same position in their respective frames;
   when inter-frame predictive coding is performed on the first CTU, ensuring that a splitting depth of the first CTU does not exceed the first maximum depth;
   for any third CTU in a to-be-coded non-reference B frame in the current group of pictures, determining a second maximum depth of a fourth CTU from a reference B frame that is the closest to the to-be-coded non-reference B frame in the current group of pictures and of which inter-frame predictive coding is completed, wherein the fourth CTU and the third CTU are in a same position in their respective frames; and
   when inter-frame predictive coding is performed on the third CTU, ensuring that a splitting depth of the third CTU does not exceed the second maximum depth.

2. The method according to claim 1, further comprising:
   when the first maximum depth is equal to a preset maximum depth, skipping a mode decision process with a depth of 0 when inter-frame predictive coding is performed on the first CTU.

3. The method according to claim 1, further comprising:
   when inter-frame predictive coding is performed on the first CTU, in a mode decision process of the first CTU with any depth, skipping mode operations of an inter-frame N×2N mode and an inter-frame 2N×N mode, and performing mode operations of other modes by using a sum of absolute differences (SAD) algorithm.

4. The method according to claim 1, further comprising:
   when the second maximum depth is equal to a preset maximum depth or the preset maximum depth minus 1, skipping a mode decision process with a depth of 0 when inter-frame predictive coding is performed on the third CTU.

5. The method according to claim 1, further comprising:
   when inter-frame predictive coding is performed on the third CTU, in a mode decision process of the third CTU with any depth, skipping mode operations of an inter-frame N×2N mode and an inter-frame 2N×N mode, and performing mode operations of other modes by using a sum of absolute differences (SAD) algorithm.

6. The method according to claim 1, further comprising:
   when a GPB frame of which inter-frame predictive coding is completed exists in the current group of pictures, for any fifth CTU in a to-be-coded GPB frame in the current group of pictures, determining a third maximum depth of a sixth CTU from the GPB frame of which inter-frame predictive coding is completed, wherein the sixth CTU and the fifth CTU are in a same position in their respective frames; and when inter-frame predictive coding is performed on the fifth CTU, ensuring that a splitting depth of the fifth CTU does not exceed the third maximum depth; and
   when no GPB frame of which inter-frame predictive coding is completed exists in the current group of pictures, for any seventh CTU in a to-be-coded GPB frame in the current group of pictures, determining a fourth maximum depth of an eighth CTU from a GPB frame in a previous group of pictures, wherein the eighth CTU and the seventh CTU are in a same position in their respective frames; and when inter-frame predictive coding is performed on the seventh CTU, ensuring that a splitting depth of the seventh CTU does not exceed the fourth maximum depth.

7. The method according to claim 6, further comprising:
if the third maximum depth or the fourth maximum depth is equal to a preset maximum depth, skipping a mode decision process with a depth of 0 when inter-frame predictive coding is performed on the fifth or seventh CTU.

8. The method according to claim 6, further comprising:
when inter-frame predictive coding is performed on the fifth or seventh CTU, in mode decisions of the fifth or seventh CTU with depths of 0 to a preset maximum depth minus 1, skipping mode operations of an inter-frame N×2N mode and an inter-frame 2N×N mode, and performing a mode operation on the fifth or seventh CTU by using a sum of absolute transformed differences (SATD) algorithm; and
in a mode decision of the fifth or seventh CTU with a depth of the preset maximum depth, performing mode operations of the inter-frame N×2N mode and the inter-frame 2N×N mode, and performing a mode operation on the fifth or seventh CTU by using the SATD algorithm.

9. The method according to claim 1, further comprising:
when a P frame of which inter-frame predictive coding is completed exists in the current group of pictures, for any ninth CTU in a to-be-coded P frame in the current group of pictures, determining a fifth maximum depth of a tenth CTU from the P frame of which inter-frame predictive coding is completed, wherein the tenth CTU and the ninth CTU are in a same position in their respective frames; and when inter-frame predictive coding is performed on the ninth CTU, ensuring that a splitting depth of the ninth CTU does not exceed the fifth maximum depth; and
when no P frame of which inter-frame predictive coding is completed exists in the current group of pictures, for any eleventh CTU in a to-be-coded P frame in the current group of pictures, determining a sixth maximum depth of a twelfth CTU from a P frame in a previous group of pictures, wherein the twelfth CTU and the eleventh CTU are in a same position in their respective frames; and when inter-frame predictive coding is performed on the eleventh CTU, ensuring that a splitting depth of the eleventh CTU does not exceed the sixth maximum depth.

10. The method according to claim 9, further comprising:
when the fifth maximum depth or the sixth maximum depth is equal to a preset maximum depth, skipping a mode decision process with a depth of 0 when inter-frame predictive coding is performed on the ninth or eleventh CTU.

11. The method according to claim 9, further comprising:
when inter-frame predictive coding is performed on the ninth or eleventh CTU, in mode decisions of the ninth or eleventh CTU with depths of 0 to a preset maximum depth minus 1, skipping mode operations of an inter-frame N×2N mode and an inter-frame 2N×N mode, and performing a mode operation on the ninth or eleventh CTU by using a sum of absolute transformed differences (SATD) algorithm; and
in a mode decision of the ninth or eleventh CTU with a depth of the preset maximum depth, performing mode operations of the inter-frame N×2N mode and the inter-frame 2N×N mode, and performing a mode operation on the ninth or eleventh CTU by using the SATD algorithm.

12. A coder, comprising:
an interface configured to sequentially read groups of pictures; and
at least one processor configured to perform inter-frame predictive coding on frames in each group of pictures, wherein to perform the inter-frame predictive coding on frames in a current group of pictures, the at least one processor is configured to:
for any first CTU in a to-be-coded reference B frame in the current group of pictures, determine a first maximum depth of a second CTU from a generalized PB (GPB) frame or P frame that is the closest to the to-be-coded reference B frame in the current group of pictures and of which inter-frame predictive coding is completed, wherein the second CTU and the first CTU are in a same position in their respective frames;
when inter-frame predictive coding is performed on the first CTU, ensure that a splitting depth of the first CTU does not exceed the first maximum depth;
for any third CTU in a to-be-coded non-reference B frame in the current group of pictures, determine a second maximum depth of a fourth CTU from a reference B frame that is the closest to the to-be-coded non-reference B frame in the current group of pictures and of which inter-frame predictive coding is completed, wherein the fourth CTU and the third CTU are in a same position in their respective frames; and
when inter-frame predictive coding is performed on the third CTU, ensure that a splitting depth of the third CTU does not exceed the second maximum depth.

13. The coder according to claim 12, wherein the at least one processor is further configured to:
when the first maximum depth is equal to a preset maximum depth, skip a mode decision process with a depth of 0 when inter-frame predictive coding is performed on the first CTU.

14. The coder according to claim 12, wherein the at least one processor is further configured to:
when inter-frame predictive coding is performed on the first CTU, in a mode decision process of the first CTU with any depth, skip mode operations of an inter-frame N×2N mode and an inter-frame 2N×N mode, and perform mode operations of other modes by using a sum of absolute differences (SAD) algorithm.

15. The coder according to claim 12, wherein the at least one processor is further configured to:
when the second maximum depth is equal to a preset maximum depth or the preset maximum depth minus 1, skip a mode decision process with a depth of 0 when inter-frame predictive coding is performed on the third CTU.

16. The coder according to claim 12, wherein the at least one processor is configured to:
when inter-frame predictive coding is performed on the third CTU, in a mode decision process of the third CTU with any depth, skip mode operations of an inter-frame N×2N mode and an inter-frame 2N×N mode, and perform mode operations of other modes by using a sum of absolute differences (SAD) algorithm.

17. The coder according to claim 12, wherein the at least one processor is further configured to:
when a GPB frame of which inter-frame predictive coding is completed exists in the current group of pictures, for any fifth CTU in a to-be-coded GPB frame in the current group of pictures, determine a third maximum depth of a sixth CTU from the GPB frame of which inter-frame predictive coding is completed, wherein the sixth CTU and the fifth CTU are in a same position in their respective frames; and when inter-frame predictive coding is performed on the fifth CTU, ensure that a splitting depth of the fifth CTU does not exceed the third maximum depth; and when no GPB frame of which inter-frame predictive coding is completed exists in the current group of pictures, for any seventh CTU in a to-be-coded GPB frame in the current group of pictures, determine a fourth maximum depth of an eighth CTU from a GPB frame in a previous group of pictures, wherein the eighth CTU and the seventh CTU are in a same position in their respective frames; and when inter-frame predictive coding is performed on the seventh CTU, ensure that a splitting depth of the seventh CTU does not exceed the fourth maximum depth.

18. The coder according to claim 17, wherein the at least one processor is further configured to:
if the third maximum depth or the fourth maximum depth is equal to a preset maximum depth, skip a mode decision process with a depth of 0 when inter-frame predictive coding is performed on the fifth or seventh CTU.

19. The coder according to claim 17, wherein the at least one processor is further configured to:
when inter-frame predictive coding is performed on the fifth or seventh CTU, in mode decisions of the fifth or seventh CTU with depths of 0 to a preset maximum depth minus 1, skip mode operations of an inter-frame N×2N mode and an inter-frame 2N×N mode, and perform a mode operation on the fifth or seventh CTU by using a sum of absolute transformed differences (SATD) algorithm; and
in a mode decision of the fifth or seventh CTU with a depth of the preset maximum depth, perform mode operations of the inter-frame N×2N mode and the inter-frame 2N×N mode, and perform a mode operation on the fifth or seventh CTU by using the SATD algorithm.

20. The coder according to claim 12, wherein the at least one processor is further configured to:
when a P frame of which inter-frame predictive coding is completed exists in the current group of pictures, for any ninth CTU in a to-be-coded P frame in the current group of pictures, determine a fifth maximum depth of a tenth CTU from the P frame of which inter-frame predictive coding is completed, wherein the tenth CTU and the ninth CTU are in a same position in their respective frames; and when inter-frame predictive coding is performed on the ninth CTU, ensure that a splitting depth of the ninth CTU does not exceed the fifth maximum depth; and when no P frame of which inter-frame predictive coding is completed exists in the current group of pictures, for any eleventh CTU in a to-be-coded P frame in the current group of pictures, determine a sixth maximum depth of a twelfth CTU from a P frame in a previous group of pictures, wherein the twelfth CTU and the eleventh CTU are in a same position in their respective frames; and when inter-frame predictive coding is performed on the eleventh CTU, ensure that a splitting depth of the eleventh CTU does not exceed the sixth maximum depth.

21. The coder according to claim 20, wherein the at least one processor is further configured to:
when the fifth maximum depth or the sixth maximum depth is equal to a preset maximum depth, skip a mode decision process with a depth of 0 when inter-frame predictive coding is performed on the ninth or eleventh CTU.

22. The coder according to claim 20, wherein the at least one processor is further configured to:
when inter-frame predictive coding is performed on the ninth or eleventh CTU, in mode decisions of the ninth or eleventh CTU with depths of 0 to a preset maximum depth minus 1, skip mode operations of an inter-frame N×2N mode and an inter-frame 2N×N mode, and perform a mode operation on the ninth or eleventh CTU by using a sum of absolute transformed differences (SATD) algorithm; and
in a mode decision of the ninth or eleventh CTU with a depth of the preset maximum depth, perform mode operations of the inter-frame N×2N mode and the inter-frame 2N×N mode, and perform a mode operation on the ninth or eleventh CTU by using the SATD algorithm.

* * * * *